US012484606B2

(12) United States Patent
Metcalf

(10) Patent No.: US 12,484,606 B2
(45) Date of Patent: Dec. 2, 2025

(54) COMPOSITIONS AND METHODS RELATED TO ANIONIC CANNABINOID MOLECULES

(71) Applicant: Natural Extraction Systems, LLC, Boulder, CO (US)

(72) Inventor: Douglas G. Metcalf, Boulder, CO (US)

(73) Assignee: Natural Extraction Systems, LLC, Boulder, CO (US)

( * ) Notice: Subject to any disclaimer, the term of this patent is extended or adjusted under 35 U.S.C. 154(b) by 1210 days.

(21) Appl. No.: 17/413,452

(22) PCT Filed: Dec. 12, 2019

(86) PCT No.: PCT/US2019/065987
§ 371 (c)(1),
(2) Date: Jun. 11, 2021

(87) PCT Pub. No.: WO2020/123809
PCT Pub. Date: Jun. 18, 2020

(65) Prior Publication Data
US 2022/0071256 A1 Mar. 10, 2022

Related U.S. Application Data

(63) Continuation of application No. 16/440,878, filed on Jun. 13, 2019, now Pat. No. 10,555,914, and a continuation of application No. 16/440,889, filed on Jun. 13, 2019, now Pat. No. 10,959,961, and a continuation of application No. 16/239,463, filed on Jan. 3, 2019, now Pat. No. 10,609,944.

(60) Provisional application No. 62/935,484, filed on Nov. 14, 2019, provisional application No. 62/933,748, filed on Nov. 11, 2019, provisional application No. 62/928,941, filed on Oct. 31, 2019, provisional application No. 62/867,207, filed on Jun. 26, 2019, provisional application No. 62/860,223, filed on Jun. 11, 2019, provisional application No. 62/812,845, filed on Mar. 1, 2019, provisional application No. 62/812,849, filed on Mar. 1, 2019, provisional application No. 62/787,717, filed on Jan. 2, 2019, provisional application No. 62/787,722, filed on Jan. 2, 2019, provisional application No. 62/787,720, filed on Jan. 2, 2019, provisional application No. 62/780,178, filed on Dec. 14, 2018, provisional application No. 62/780,169, filed on Dec. 14, 2018, provisional application No. 62/780,176, filed on Dec. 14, 2018.

(51) Int. Cl.
| A23L 33/105 | (2016.01) |
| A23L 2/38 | (2021.01) |
| A23L 2/52 | (2006.01) |
| A23L 2/60 | (2006.01) |
| A23L 29/00 | (2016.01) |
| A61K 31/00 | (2006.01) |
| A61K 36/185 | (2006.01) |

(52) U.S. Cl.
CPC .......... *A23L 33/105* (2016.08); *A23L 2/38* (2013.01); *A23L 2/52* (2013.01); *A23L 2/60* (2013.01); *A23L 29/035* (2016.08); *A61K 31/658* (2023.05); *A61K 36/185* (2013.01); *A23V 2002/00* (2013.01); *A23V 2250/2132* (2013.01)

(58) Field of Classification Search
CPC ........ A23L 33/105; A23L 29/035; A23L 2/38; A23L 2/52; A23L 2/60; A61K 36/185; A23V 2002/00; A23V 2250/2132
See application file for complete search history.

(56) References Cited

U.S. PATENT DOCUMENTS

| 9,907,823 B1 | 3/2018 | Kuhrts | |
| 10,555,914 B1* | 2/2020 | Metcalf | A23L 2/52 |
| 10,609,944 B1* | 4/2020 | Metcalf | A23L 33/105 |
| 10,959,961 B2* | 3/2021 | Metcalf | A23L 33/105 |
| 2007/0105086 A1 | 5/2007 | Qin | |
| 2009/0044700 A1 | 2/2009 | Dietlin | |
| 2014/0263467 A1 | 9/2014 | Wardle | |
| 2015/0320720 A1 | 11/2015 | McAllister et al. | |
| 2016/0018424 A1 | 1/2016 | Lucas et al. | |
| 2017/0246897 A1 | 8/2017 | Brehm et al. | |
| 2018/0169035 A1 | 6/2018 | Eyal et al. | |
| 2019/0030170 A1 | 1/2019 | Kingsley et al. | |

FOREIGN PATENT DOCUMENTS

| CA | 2760460 A1 | 11/2010 |
| CN | 108314608 A | 7/2018 |
| EP | 3061450 A1 | 8/2016 |
| EP | 3351242 A1 | 7/2018 |
| EP | 3459536 A1 | 3/2019 |
| TW | 201718493 A | 6/2017 |
| WO | 2006133941 A2 | 12/2006 |
| WO | 2017202424 A1 | 11/2017 |
| WO | 2018158150 A1 | 7/2018 |
| WO | 2018183115 A1 | 10/2018 |
| WO | 2019036243 A1 | 2/2019 |

OTHER PUBLICATIONS

Dow Corning, "Corning® Plastic Storage Bottles Selection Guide," 2016, 8 pages.
Gelderblom et al., "Cremophor EL: the drawbacks and advantages of vehicle selection for drug formulation," European Journal of Cancer, 2001, pp. 1590-1998, vol. 37.

(Continued)

*Primary Examiner* — Timothy R Rozof
(74) *Attorney, Agent, or Firm* — Douglas G. Metcalf

(57) ABSTRACT

This patent document discloses compositions and methods related to anionic cannabinoid molecules that contain oxide substituents.

19 Claims, No Drawings

(56) References Cited

OTHER PUBLICATIONS

Kogan et al., "Synthesis and antitumor activity of quinonoid derivatives of cannabinoids," Journal of Medicinal Chemistry, 2004, pp. 3800-3806, vol. 47, issue 15.
Layton et al., "Forced degradation of cannabidiol," 2016, publisher Waters Corporation, 6 pages.
Martijn, "CBD products according to sensi seeds," 2016, 12 pages.
Mazina et al., "A rapid capillary electrophoresis method with LED-induced native fluorescence detection for the analysis of cannabinoids in oral fluid," Analytical Methods, 2015, pp. 7741-7747, vol. 7.
Mechoulam et al., "Hashish-X111: On the nature of the beam test," Tetrahedron, 1968, pp. 5615-5624, vol. 24, issue 16.
Mechoulam et al., "Cannabidiol: an overview of some chemical and pharmacological aspects. Part I: chemical aspects," Chemistry and Physics of Lipids, 2002, pp. 35-43, vol. 121.
Srebnik et al., "Base-catalysed double-bond isomerizations of cannabinoids: structural and stereochemical aspects," Journal of the Chemical Society, Perkin Transactions I, 1984, pp. 2881-2886.
Starks, "Marijuana Chemistry: Genetics, Processing & Potency", 2nd ed., 1990, onin Publishing, Inc. (Berkeley CA).
Wilson et al., "HU-331 and oxidized cannabidiol acts as inhibitors of human topoisomerase IIα and β," Chemical Research in Toxicology, 2017, pp. 137-144, vol. 31.

* cited by examiner

COMPOSITIONS AND METHODS RELATED TO ANIONIC CANNABINOID MOLECULES

RELATED APPLICATIONS

This patent document is the United States national stage under 35 U.S.C. § 371 of International Application No. PCT/US19/65987, which claims priority to U.S. Ser. No. 16/239,463, which granted as U.S. Pat. No. 10,609,944; U.S. Ser. No. 16/440,878, which granted as U.S. Pat. No. 10,555,914; U.S. Ser. No. 16/440,889, which granted as U.S. Pat. No. 10,959,961; and the following United States Provisional Patent Applications: U.S. 62/780,169, filed Dec. 14, 2018; U.S. 62/780,176, filed Dec. 14, 2018; U.S. 62/780,178, filed Dec. 14, 2018; U.S. 62/787,717, filed Jan. 2, 2019; U.S. 62/787,720, filed Jan. 2, 2019; U.S. 62/787,722, filed Jan. 2, 2019; U.S. 62/812,845, filed Mar. 1, 2019; U.S. 62/812,849, filed Mar. 1, 2019; U.S. 62/860,223, filed Jun. 11, 2019; U.S. 62/867,207, filed Jun. 26, 2019; U.S. 62/928,941, filed Oct. 31, 2019; U.S. 62/933,748, filed Nov. 11, 2019; and U.S. 62/935,484, filed Nov. 14, 2019, each of which is incorporated by reference in its entirety.

BACKGROUND

Cannabinoid molecules are generally insoluble in water. This insolubility both limits the ability to formulate beverages containing cannabinoid molecules and limits the bioavailability of cannabinoid molecules independent of a specific formulation. Cannabinoid molecules with improved solubility in water remain desirable.

SUMMARY

Cannabinoid molecules generally comprise hydroxyl substituents. Various aspects of this patent document relate to the discovery that a hydroxyl substituent of a cannabinoid molecule can be deprotonated to produce an anionic cannabinoid molecule that has useful properties. Various cannabinoid molecules and anionic cannabinoid molecules are depicted in Formulas 1a, 1b, 2a, 2b, 3a, 3b, 4a, 4b, 5a, 5b, 6a, 6b, 7a, and 7b. Cannabinoid molecules contain the letter "a" in their Formula identifiers, and anionic cannabinoid molecules contain the letter "b" in their Formula identifiers. The anionic cannabinoid molecules 1b, 2b, 3b, 4b, 5b, 6b, and 7b can be produced from cannabinoid molecules 1a, 2a, 3a, 4a, 5a, 6a, and 7a, respectively, by deprotonating a hydroxyl substituent of each cannabinoid molecule with a Brønsted base.

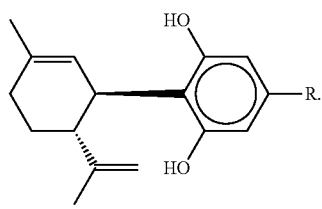

1a

2-[(1R,6R)-6-isopropenyl-3-methylcyclohex-2-en-1-yl]-5-alkylbenzene-1,3-diol

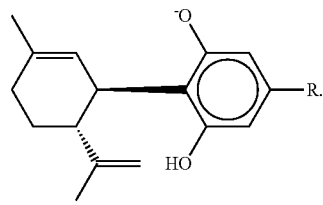

1b

2-[(1R,6R)-6-isopropenyl-3-methylcyclohex-2-en-1-yl]-3-hydroxy-5-alkylphenolate

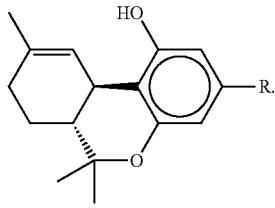

2a (6aR,10aR)-3-alkyl-6,6,9-trimethyl-6a,7,8,10a-tetrahydro-6H-benzo[c]chromen-1-ol

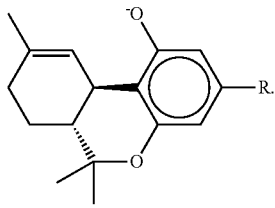

2b (6aR,10aR)-3-alkyl-6,6,9-trimethyl-6a,7,8,10a-tetrahydro-6H-benzo[c]chromen-1-oxide

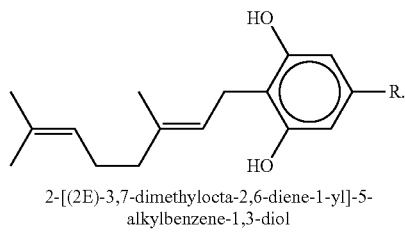

3a

2-[(2E)-3,7-dimethylocta-2,6-diene-1-yl]-5-alkylbenzene-1,3-diol

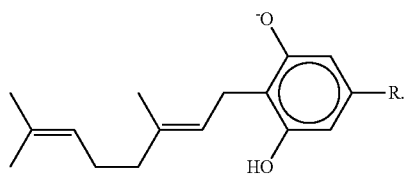

3b

2-[(2E)-3,7-dimethylocta-2,6-diene-1-yl]-3-hydroxy-5-alkylphenolate

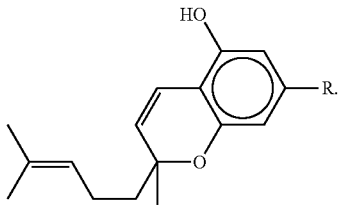

4a 2-methyl-2-(4-methylpent-3-en-1-yl)-5-hydroxy-7-alkyl-2H-1-benzopyran

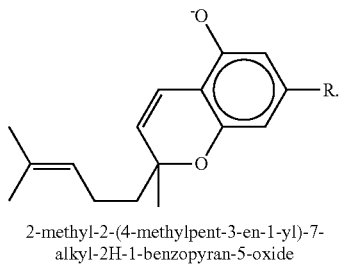

2-methyl-2-(4-methylpent-3-en-1-yl)-7-alkyl-2H-1-benzopyran-5-oxide

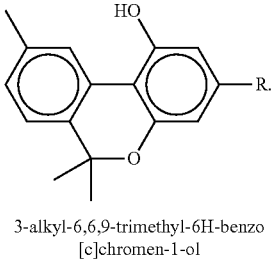

3-alkyl-6,6,9-trimethyl-6H-benzo[c]chromen-1-ol

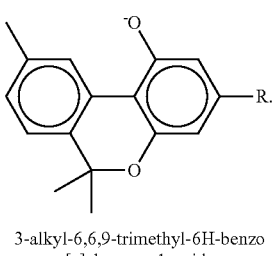

3-alkyl-6,6,9-trimethyl-6H-benzo[c]chromen-1-oxide

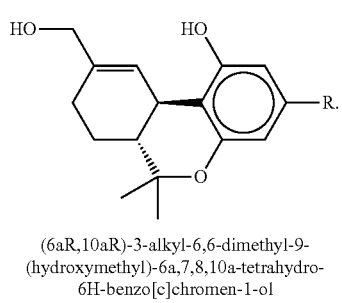

(6aR,10aR)-3-alkyl-6,6-dimethyl-9-(hydroxymethyl)-6a,7,8,10a-tetrahydro-6H-benzo[c]chromen-1-ol

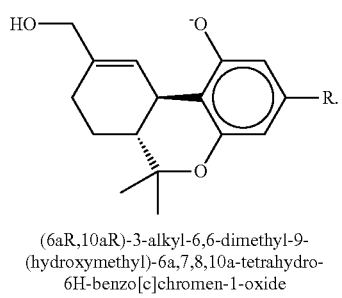

(6aR,10aR)-3-alkyl-6,6-dimethyl-9-(hydroxymethyl)-6a,7,8,10a-tetrahydro-6H-benzo[c]chromen-1-oxide

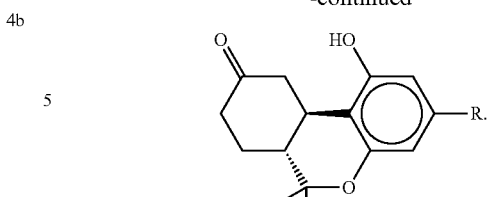

(6aR,10aR)-1-hydroxy-3-alkyl-6,6-dimethyl-6a,6a,7,8,10,10a-hexahydro-9H-benzo[c]chromen-9-one

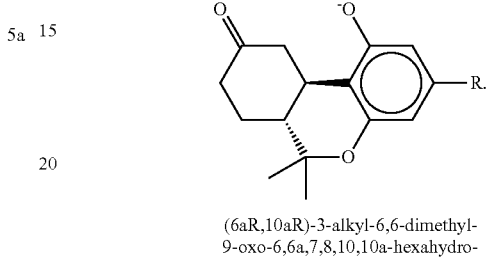

(6aR,10aR)-3-alkyl-6,6-dimethyl-9-oxo-6,6a,7,8,10,10a-hexahydro-9H-benzo[c]chromen-1-oxide The cannabinoid molecules 1a, 2a, 3a, 4a, 5a, 6a, and 7a are the conjugate acids of the anionic cannabinoid molecules 1b, 2b, 3b, 4b, 5b, 6b, and 7b, respectively. Formulas 1a, 1b, 2a, 2b, 3a, 3b, 6a, 6b, 7a, and 7b depict preferred stereochemistry. Alternate stereochemistries fall within the scope of this patent document. The lack of a stereochemical identifier in the chemical name of a molecule that has stereochemistry indicates that the chemical name encompasses each stereoisomer of the molecule. For example, the lack of a stereochemical identifier in the chemical names of Formulas 4a and 4b indicates that these chemical names encompass both the 2R and 2S stereoisomers of these molecules.

The cannabinoid molecules 1a, 2a, 3a, 4a, 5a, 6a, and 7a each comprise an aromatic ring and a hydroxyl group, in which the hydroxyl group is a substituent on the aromatic ring. The anionic cannabinoid molecules 1b, 2b, 3b, 4b, 5b, 6b, and 7b each comprise an aromatic ring and an oxide group, in which the oxide group is a substituent on the aromatic ring; the oxide group has a negative charge; and the negative charge is delocalized throughout the aromatic ring. The term "phenolate" refers to a benzene ring that contains an oxide substituent at the "1" position of the benzene ring.

"Alkyl" and "R" refer to a variable substituent. In some embodiments, "alkyl" and "R" refer to a variable substituent that consists of hydrogen, carbon, oxygen, and halogen atoms. In some specific embodiments, "alkyl" and "R" refer to a variable substituent that consists of 0 to 9 carbon atoms and 1 to 19 hydrogen atoms. In some very specific embodiments, "alkyl" and "R" refer to hydro; methyl; ethyl; prop-1-yl; but-1-yl; pent-1-yl; hex-1-yl; hept-1-yl; oct-1-yl; prop-2-yl; but-2-yl; pent-2-yl; hex-2-yl; hept-2-yl; oct-2-yl; 2-methylprop-2-yl; 2-methylbut-2-yl; 2-methylpent-2-yl; 2-methylhex-2-yl; 2-methylhept-2-yl; 2-methyloct-2-yl; 3-methylprop-2-yl; 3-methylbut-2-yl; 3-methylpent-2-yl; 3-methylhex-2-yl; 3-methylhept-2-yl; 3-methyloct-2-yl; or 2-phenyleth-1-yl. Each substituent of the preceding sentence consists of 0 to 9 carbon atoms and 1 to 19 hydrogen atoms. In some preferred embodiments, alkyl is prop-1-yl (which is synonymous with "propyl") or pent-1-yl (which is synonymous with "pentyl").

The phrases "consisting of," "consists of," and "consist of" refer to closed sets. For example, a variable substituent that consists of 0 to 9 carbon atoms and 1 to 19 hydrogen atoms cannot also comprise an oxygen atom. The words "comprising," "comprises," and "comprise" refer to open sets. For example, an anionic cannabinoid molecule that comprises an oxide group can also comprise a variable substituent.

In all embodiments of this patent document, a cannabinoid molecule consists of hydrogen atoms, carbon atoms, oxygen atoms, and optionally one or more halogen atoms. In some preferred embodiments, a cannabinoid molecule consists of 16 to 40 hydrogen atoms, 15 to 25 carbon atoms, and either 2 or 3 oxygen atoms. In all embodiments of this patent document, an anionic cannabinoid molecule consists of hydrogen atoms, carbon atoms, oxygen atoms, and optionally one or more halogen atoms. In some preferred embodiments, an anionic cannabinoid molecule consists of 15 to 39 hydrogen atoms, 15 to 25 carbon atoms, and either 2 or 3 oxygen atoms. In all embodiments of this patent document, a cannabinoid molecule lacks nitrogen atoms, sulfur atoms, and phosphorous atoms. In all embodiments of this patent document, an anionic cannabinoid molecule lacks nitrogen atoms, sulfur atoms, and phosphorous atoms. In all embodiments of this patent document, a cannabinoid molecule lacks both a carboxylic acid substituent and a carboxylate substituent. In all embodiments of this patent document, an anionic cannabinoid molecule lacks both a carboxylic acid substituent and a carboxylate substituent.

DETAILED DESCRIPTION

I. Compositions Comprising Anionic Cannabinoid Molecules

Various aspects of this patent document relate to a composition comprising an anionic cannabinoid molecule.

In some embodiments, the anionic cannabinoid molecule is 3-alkyl-6,6,9-trimethyl-6H-benzo[c]chromen-1-oxide. In some specific embodiments, the anionic cannabinoid molecule is 3-propyl-6,6,9-trimethyl-6H-benzo[c]chromen-1-oxide or 3-pentyl-6,6,9-trimethyl-6H-benzo[c]chromen-1-oxide.

In some embodiments, the anionic cannabinoid molecule is 2-[3,7-dimethylocta-2,6-diene-1-yl]-3-hydroxy-5-alkylphenolate. In some specific embodiments, the anionic cannabinoid molecule is 2-[(2E)-3,7-dimethylocta-2,6-diene-1-yl]-3-hydroxy-5-alkylphenolate. In some specific embodiments, the anionic cannabinoid molecule is 2-[3,7-dimethylocta-2,6-diene-1-yl]-3-hydroxy-5-propylphenolate or 2-[3,7-dimethylocta-2,6-diene-1-yl]-3-hydroxy-5-pentylphenolate. In some very specific embodiments, the anionic cannabinoid molecule is 2-[(2E)-3,7-dimethylocta-2,6-diene-1-yl]-3-hydroxy-5-propylphenolate or 2-[(2E)-3,7-dimethylocta-2,6-diene-1-yl]-3-hydroxy-5-pentylphenolate.

In some embodiments, the anionic cannabinoid molecule is 3-alkyl-6,6-dimethyl-9-oxo-6,6a,7,8,10,10a-hexahydro-9H-benzo[c]chromen-1-oxide. In some specific embodiments, the anionic cannabinoid molecule is (6aR,10aR)-3-alkyl-6,6-dimethyl-9-oxo-6,6a,7,8,10,10a-hexahydro-9H-benzo[c]chromen-1-oxide. In some specific embodiments, the anionic cannabinoid molecule is 3-(2-methyloct-2-yl)-6,6-dimethyl-9-oxo-6,6a,7,8,10,10a-hexahydro-9H-benzo[c]chromen-1-oxide. In some very specific embodiments, the anionic cannabinoid molecule is (6aR,10aR)-3-(2-methyloct-2-yl)-6,6-dimethyl-9-oxo-6,6a,7,8,10,10a-hexahydro-9H-benzo[c]chromen-1-oxide.

In some embodiments, the anionic cannabinoid molecule is 3-alkyl-6,6-dimethyl-9-(hydroxymethyl)-6a,7,8,10a-tetrahydro-6H-benzo[c]chromen-1-oxide. In some specific embodiments, the anionic cannabinoid molecule is (6aR,10aR)-3-alkyl-6,6-dimethyl-9-(hydroxymethyl)-6a,7,8,10a-tetrahydro-6H-benzo[c]chromen-1-oxide. In some specific embodiments, the anionic cannabinoid molecule is 3-propyl-6,6-dimethyl-9-(hydroxymethyl)-6a,7,8,10a-tetrahydro-6H-benzo[c]chromen-1-oxide or 3-pentyl-6,6-dimethyl-9-(hydroxymethyl)-6a,7,8,10a-tetrahydro-6H-benzo[c]chromen-1-oxide. In some very specific embodiments, the anionic cannabinoid molecule is (6aR,10aR)-3-propyl-6,6-dimethyl-9-(hydroxymethyl)-6a,7,8,10a-tetrahydro-6H-benzo[c]chromen-1-oxide or (6aR,10aR)-3-pentyl-6,6-dimethyl-9-(hydroxymethyl)-6a,7,8,10a-tetrahydro-6H-benzo[c]chromen-1-oxide.

In some embodiments, the anionic cannabinoid molecule is 2-methyl-2-(4-methylpent-3-en-1-yl)-7-alkyl-2H-1-benzopyran-5-oxide. In some specific embodiments, the anionic cannabinoid molecule is (2R)-2-methyl-2-(4-methylpent-3-en-1-yl)-7-alkyl-2H-1-benzopyran-5-oxide or (2S)-2-methyl-2-(4-methylpent-3-en-1-yl)-7-alkyl-2H-1-benzopyran-5-oxide. In some specific embodiments, the anionic cannabinoid molecule is 2-methyl-2-(4-methylpent-3-en-1-yl)-7-propyl-2H-1-benzopyran-5-oxide or 2-methyl-2-(4-methylpent-3-en-1-yl)-7-pentyl-2H-1-benzopyran-5-oxide. In some very specific embodiments, the anionic cannabinoid molecule is (2R)-2-methyl-2-(4-methylpent-3-en-1-yl)-7-propyl-2H-1-benzopyran-5-oxide, (2R)-2-methyl-2-(4-methylpent-3-en-1-yl)-7-pentyl-2H-1-benzopyran-5-oxide, (2S)-2-methyl-2-(4-methylpent-3-en-1-yl)-7-propyl-2H-1-benzopyran-5-oxide, or (2S)-2-methyl-2-(4-methylpent-3-en-1-yl)-7-pentyl-2H-1-benzopyran-5-oxide.

In some embodiments, the anionic cannabinoid molecule is 3-alkyl-6,6,9-trimethyl-6a,7,8,10a-tetrahydro-6H-benzo[c]chromen-1-oxide. In some specific embodiments, the anionic cannabinoid molecule is (6aR,10aR)-3-alkyl-6,6,9-trimethyl-6a,7,8,10a-tetrahydro-6H-benzo[c]chromen-1-oxide. In some specific embodiments, the anionic cannabinoid molecule is 3-propyl-6,6,9-trimethyl-6a,7,8,10a-tetrahydro-6H-benzo[c]chromen-1-oxide or 3-pentyl-6,6,9-trimethyl-6a,7,8,10a-tetrahydro-6H-benzo[c]chromen-1-oxide. In some very specific embodiments, the anionic cannabinoid molecule is (6aR,10aR)-3-propyl-6,6,9-trimethyl-6a,7,8,10a-tetrahydro-6H-benzo[c]chromen-1-oxide or (6aR,10aR)-3-pentyl-6,6,9-trimethyl-6a,7,8,10a-tetrahydro-6H-benzo[c]chromen-1-oxide.

In some embodiments, the anionic cannabinoid molecule is 2-[6-isopropenyl-3-methylcyclohex-2-en-1-yl]-3-hydroxy-5-alkylphenolate. In some specific embodiments, the anionic cannabinoid molecule is 2-[(1R,6R)-6-isopropenyl-3-methylcyclohex-2-en-1-yl]-3-hydroxy-5-alkylphenolate. In some specific embodiments, the anionic cannabinoid molecule is 2-[6-isopropenyl-3-methylcyclohex-2-en-1-yl]-3-hydroxy-5-propylphenolate or 2-[6-isopropenyl-3-methylcyclohex-2-en-1-yl]-3-hydroxy-5-pentylphenolate. In some very specific embodiments, the anionic cannabinoid molecule is 2-[(1R,6R)-6-isopropenyl-3-methylcyclohex-2-en-1-yl]-3-hydroxy-5-propylphenolate or 2-[(1R,6R)-6-isopropenyl-3-methylcyclohex-2-en-1-yl]-3-hydroxy-5-pentylphenolate.

In some embodiments, the composition further comprises a solvent, in which the composition comprises a liquid, the liquid comprises the solvent, and the anionic cannabinoid molecule is solute that is dissolved in the solvent. In some specific embodiments, the solvent is a protic polar solvent. In some very specific embodiments, the solvent is water or ethanol.

The term "dissolved" refers to a molecule that is a solute of a solvent such as water. A molecule that is merely suspended within a solvent, such as a molecule of an emulsion, is not dissolved. A molecule that exists in a complex with a dissolved solute is not dissolved. A cannabinoid molecule that is covalently or non-covalently associated with another cannabinoid molecule, another lipid, an amphiphilic molecule, a carbohydrate (such as a cyclodextrin), or a polymer (such as polyethylene glycol) is not dissolved in a solvent.

In some embodiments, the composition further comprises a cation, in which the composition comprises a solid that is a salt, and the salt comprises both the cation and the anionic cannabinoid molecule. In some specific embodiments, the cation is a metal ion. In some very specific embodiments, the cation is sodium ion ($Na^+$) or potassium ion ($K^+$).

In some embodiments, alkyl consists of hydrogen, carbon, oxygen, and halogen atoms. In some specific embodiments, alkyl consists of 0 to 9 carbon atoms and 1 to 19 hydrogen atoms. In some very specific embodiments, alkyl is hydro, methyl, ethyl, prop-1-yl, but-1-yl, pent-1-yl, hex-1-yl, hept-1-yl, oct-1-yl, prop-2-yl, but-2-yl, pent-2-yl, hex-2-yl, hept-2-yl, oct-2-yl, 2-methylprop-2-yl, 2-methylbut-2-yl, 2-methylpent-2-yl, 2-methylhex-2-yl, 2-methylhept-2-yl, 2-methyloct-2-yl, 3-methylprop-2-yl, 3-methylbut-2-yl, 3-methylpent-2-yl, 3-methylhex-2-yl, 3-methylhept-2-yl, 3-methyloct-2-yl, or 2-phenyleth-1-yl. In some preferred embodiments, alkyl is prop-1-yl or pent-1-yl.

II. Liquid Compositions

Various aspects of this patent document relate to a composition comprising an anionic cannabinoid molecule and a protic polar solvent, in which the composition is a liquid; the composition comprises the protic polar solvent at a concentration greater than 50 percent by mass; the anionic cannabinoid molecule is a solute that is dissolved in the protic polar solvent; the anionic cannabinoid molecule comprises an aromatic ring and an oxide group, in which the oxide group is a substituent on the aromatic ring, the oxide group has a negative charge, and the negative charge is delocalized throughout the aromatic ring; the anionic cannabinoid molecule lacks both a carboxylic acid substituent and a carboxylate substituent; the protic polar solvent consists of molecules that each comprise a hydroxyl group; the protic polar solvent lacks both a carboxylic acid substituent and a carboxylate substituent; and a hydroxyl group of a molecule of the solvent forms a hydrogen bond with the oxide group of the anionic cannabinoid molecule.

In some embodiments, the protic polar solvent is water, methanol, ethanol, 1-propanol, 2-propanol, propane-1,2-diol, propane-1,3-diol, propane-1,2,3-triol, or butane-1,3-diol. In some specific embodiments, the protic polar solvent is water. In some very specific embodiments, the protic polar solvent is water; and the composition has a pH of at least 8.0. In some specific embodiments, the protic polar solvent is water, and the composition further comprises ethanol. In some specific embodiments, the protic polar solvent is ethanol. In some very specific embodiments, the protic polar solvent is ethanol, and the composition further comprises water.

In some embodiments, the composition further comprises one or more of sodium ion ($Na^+$), potassium ion ($K^+$), and chloride ion ($Cl^-$). In some specific embodiments, the composition further comprises sodium ion, potassium ion, or both sodium ion and potassium ion.

In some embodiments, the anionic cannabinoid molecule is selected from 2-[6-isopropenyl-3-methylcyclohex-2-en-1-yl]-3-hydroxy-5-alkylphenolate; 3-alkyl-6,6,9-trimethyl-6a,7,8,10a-tetrahydro-6H-benzo[c]chromen-1-oxide; 2-[3,7-dimethylocta-2,6-diene-1-yl]-3-hydroxy-5-alkylphenolate; 2-methyl-2-(4-methylpent-3-en-1-yl)-7-alkyl-2H-1-benzopyran-5-oxide; 3-alkyl-6,6,9-trimethyl-6H-benzo[c]chromen-1-oxide; 3-alkyl-6,6-dimethyl-9-(hydroxymethyl)-6a,7,8,10a-tetrahydro-6H-benzo[c]chromen-1-oxide; and 3-alkyl-6,6-dimethyl-9-oxo-6,6a,7,8,10,10a-hexahydro-9H-benzo[c]chromen-1-oxide. In some specific embodiments, the anionic cannabinoid molecule is selected from 2-[(1R,6R)-6-isopropenyl-3-methylcyclohex-2-en-1-yl]-3-hydroxy-5-alkylphenolate; (6aR,10aR)-3-alkyl-6,6,9-trimethyl-6a,7,8,10a-tetrahydro-6H-benzo[c]chromen-1-oxide; 2-[(2E)-3,7-dimethylocta-2,6-diene-1-yl]-3-hydroxy-5-alkylphenolate; 2-methyl-2-(4-methylpent-3-en-1-yl)-7-alkyl-2H-1-benzopyran-5-oxide; 3-alkyl-6,6,9-trimethyl-6H-benzo[c]chromen-1-oxide; (6aR,10aR)-3-alkyl-6,6-dimethyl-9-(hydroxymethyl)-6a,7,8,10a-tetrahydro-6H-benzo[c]chromen-1-oxide; and (6aR,10aR)-3-alkyl-6,6-dimethyl-9-oxo-6,6a,7,8,10,10a-hexahydro-9H-benzo[c]chromen-1-oxide. In some specific embodiments, the anionic cannabinoid molecule is selected from 2-[6-isopropenyl-3-methylcyclohex-2-en-1-yl]-3-hydroxy-5-pentylphenolate; 3-pentyl-6,6,9-trimethyl-6a,7,8,10a-tetrahydro-6H-benzo[c]chromen-1-oxide; 2-[(3,7-dimethylocta-2,6-diene-1-yl]-3-hydroxy-5-pentylphenolate; 2-methyl-2-(4-methylpent-3-en-1-yl)-7-pentyl-2H-1-benzopyran-5-oxide; 3-pentyl-6,6,9-trimethyl-6H-benzo[c]chromen-1-oxide; 3-pentyl-6,6-dimethyl-9-(hydroxymethyl)-6a,7,8,10a-tetrahydro-6H-benzo[c]chromen-1-oxide; 2-[6-isopropenyl-3-methylcyclohex-2-en-1-yl]-3-hydroxy-5-propylphenolate; 3-propyl-6,6,9-trimethyl-6a,7,8,10a-tetrahydro-6H-benzo[c]chromen-1-oxide; 2-[3,7-dimethylocta-2,6-diene-1-yl]-3-hydroxy-5-propylphenolate; 2-methyl-2-(4-methylpent-3-en-1-yl)-7-propyl-2H-1-benzopyran-5-oxide; 3-propyl-6,6,9-trimethyl-6H-benzo[c]chromen-1-oxide; 3-propyl-6,6-dimethyl-9-(hydroxymethyl)-6a,7,8,10a-tetrahydro-6H-benzo[c]chromen-1-oxide; and 3-(2-methyloct-2-yl)-6,6-dimethyl-9-oxo-6,6a,7,8,10,10a-hexahydro-9H-benzo[c]chromen-1-oxide. In some very specific embodiments, the anionic cannabinoid molecule is selected from 2-[(1R,6R)-6-isopropenyl-3-methylcyclohex-2-en-1-yl]-3-hydroxy-5-pentylphenolate; (6aR,10aR)-3-pentyl-6,6,9-trimethyl-6a,7,8,10a-tetrahydro-6H-benzo[c]chromen-1-oxide; 2-[(2E)-3,7-dimethylocta-2,6-diene-1-yl]-3-hydroxy-5-pentylphenolate; 2-methyl-2-(4-methylpent-3-en-1-yl)-7-pentyl-2H-1-benzopyran-5-oxide; 3-pentyl-6,6,9-trimethyl-6H-benzo[c]chromen-1-oxide; (6aR,10aR)-3-pentyl-6,6-dimethyl-9-(hydroxymethyl)-6a,7,8,10a-tetrahydro-6H-benzo[c]chromen-1-oxide; 2-[(1R,6R)-6-isopropenyl-3-methylcyclohex-2-en-1-yl]-3-hydroxy-5-propylphenolate; (6aR,10aR)-3-propyl-6,6,9-trimethyl-6a,7,8,10a-tetrahydro-6H-benzo[c]chromen-1-oxide; 2-[(2E)-3,7-dimethylocta-2,6-diene-1-yl]-3-hydroxy-5-propylphenolate; 2-methyl-2-(4-methylpent-3-en-1-yl)-7-propyl-2H-1-benzopyran-5-oxide; 3-propyl-6,6,9-trimethyl-6H-benzo[c]chromen-1-oxide; (6aR,10aR)-3-propyl-6,6-dimethyl-9-(hydroxymethyl)-6a,7,8,10a-tetrahydro-6H-benzo[c]chromen-1-oxide; and (6aR,10aR)-3-(2-methyloct-2-yl)-6,6-dimethyl-9-oxo-6,6a,7,8,10,10a-hexahydro-9H-benzo[c]chromen-1-oxide.

In some very specific embodiments, the protic polar solvent is water; the water has a pH of at least 8.0; the composition further comprises ethanol; the anionic cannabinoid molecule is selected from 2-[6-isopropenyl-3-methylcyclohex-2-en-1-yl]-3-hydroxy-5-alkylphenolate, 3-alkyl-6,6,9-trimethyl-6a,7,8,10a-tetrahydro-6H-benzo[c]chromen-1-oxide, 2-[3,7-dimethylocta-2,6-diene-1-yl]-3-hydroxy-5-alkylphenolate, 2-methyl-2-(4-methylpent-3-en-1-yl)-7-alkyl-2H-1-benzopyran-5-oxide, 3-alkyl-6,6,9-trimethyl-6H-benzo[c]chromen-1-oxide, 3-alkyl-6,6-dimethyl-9-(hydroxymethyl)-6a,7,8,10a-tetrahydro-6H-benzo[c]chromen-1-oxide, and 3-alkyl-6,6-dimethyl-9-oxo-6,6a,7,8,10,10a-hexahydro-9H-benzo[c]chromen-1-oxide; and the composition further comprises one or more of sodium ion, potassium ion, and chloride ion.

III. Methods of Consuming Compositions Comprising Anionic Cannabinoid Molecules Various aspects of this patent document relate to a method of consuming a cannabinoid, comprising providing a composition comprising an anionic cannabinoid molecule dissolved in water, in which the composition has a color; contacting the composition with a Brønsted acid, in which contacting the composition with the Brønsted acid changes the color to either a different color or no color (colorless); and consuming the composition after contacting the composition with the Brønsted acid, in which a human being consumes the composition by drinking it.

The term "Brønsted acid" refers to a proton donor. In some embodiments, the Brønsted acid is either hydronium or a carboxylic acid. In some specific embodiments, the Brønsted acid is hydronium, carbonic acid, or citric acid.

In some embodiments, the composition is a composition according to section I above, and the anionic cannabinoid molecule is an anionic cannabinoid molecule according to section I above.

In some embodiments, the composition is a composition according to section II above, and the anionic cannabinoid molecule is an anionic cannabinoid molecule according to section II above.

In some embodiments, the anionic cannabinoid molecule is selected from 2-[(1R,6R)-6-isopropenyl-3-methylcyclohex-2-en-1-yl]-3-hydroxy-5-pentylphenolate; 2-[(1R,6R)-6-isopropenyl-3-methylcyclohex-3-en-1-yl]-3-hydroxy-5-pentylphenolate; 2-[(1R,6R)-6-isopropenyl-3-methylcyclohex-2-en-1-yl]-5-pentyl-1,4-benzoquinone-3-oxide; 3-[(1R,6R)-6-isopropenyl-3-methylcyclohex-2-en-1-yl]-6-pentyl-1,2-benzoquinone-4-oxide; 2-[(1R,6R)-6-isopropenyl-3-methylcyclohex-3-en-1-yl]-5-pentyl-1,4-benzoquinone-3-oxide; 3-[(1R,6R)-6-isopropenyl-3-methylcyclohex-3-en-1-yl]-6-pentyl-1,2-benzoquinone-4-oxide; (6aR,10aR)-6,6,9-trimethyl-3-pentyl-6a,7,8,10a-tetrahydro-6H-benzo[c]chromen-1-oxide; (6aR,10aR)-6,6,9-trimethyl-3-pentyl-6a,7,10,10a-tetrahydro-6H-benzo[c]chromen-1-oxide; 2-[(2E)-3,7-dimethylocta-2,6-dienyl]-3-hydroxy-5-pentylphenolate; 2-[(1R,6R)-6-isopropenyl-3-methylcyclohex-2-en-1-yl]-3-hydroxy-5-propylphenolate; 2-[(1R,6R)-6-isopropenyl-3-methylcyclohex-3-en-1-yl]-3-hydroxy-5-propylphenolate; 2-[(1R,6R)-6-isopropenyl-3-methylcyclohex-2-en-1-yl]-5-propyl-1,4-benzoquinone-3-oxide; 3-[(1R,6R)-6-isopropenyl-3-methylcyclohex-2-en-1-yl]-6-propyl-1,2-benzoquinone-4-oxide; 2-[(1R,6R)-6-isopropenyl-3-methylcyclohex-3-en-1-yl]-5-propyl-1,4-benzoquinone-3-oxide; 3-[(1R,6R)-6-isopropenyl-3-methylcyclohex-3-en-1-yl]-6-propyl-1,2-benzoquinone-4-oxide; (6aR,10aR)-6,6,9-trimethyl-3-propyl-6a,7,8,10a-tetrahydro-6H-benzo[c]chromen-1-oxide; (6aR,10aR)-6,6,9-trimethyl-3-propyl-6a,7,10,10a-tetrahydro-6H-benzo[c]chromen-1-oxide; and 2-[(2E)-3,7-dimethylocta-2,6-dienyl]-3-hydroxy-5-propylphenolate. The "methylcyclohex-3-en-1-yl" anionic cannabinoid molecules and "6a,7,10,10a-tetrahydro" anionic cannabinoid molecules are structural isomers that form in small quantities depending on the deprotonation conditions. The "benzoquinone oxide" anionic cannabinoid molecules are oxidation products of phenols that form in small quantities depending on the deprotonation conditions. In some very specific embodiments, the anionic cannabinoid molecule is 2-[(1R,6R)-6-isopropenyl-3-methylcyclohex-2-en-1-yl]-3-hydroxy-5-pentylphenolate.

In some embodiments, the method comprises providing a hermetically-sealed container that contains the composition and unsealing the container to provide the composition. In some embodiments, the hermetically-sealed container contains 25 milliliters to 800 milliliters of the composition. In some embodiments, the composition comprises 50 micrograms to 500 milligrams of the anionic cannabinoid molecule. In some embodiments, the hermetically-sealed container is a glass bottle, plastic bottle, or aluminum can. In some embodiments, the hermetically-sealed container is physically associated with a label; the label comprises an image of a reference color; and the method comprises comparing the color to the reference color to either confirm the identity of the anionic cannabinoid molecule or confirm the approximate concentration of the anionic cannabinoid molecule in the composition.

In some embodiments, the color is purple.

In some embodiments, the composition has a pH, and the pH is 8.0 to 15.5. In some specific embodiments, the composition has a pH, and the pH is 8.5 to 10.5.

In some embodiments, the composition comprises ethanol at a concentration of at least 5 parts per billion and less than 50 percent by weight. In some specific embodiments, the composition comprises ethanol at a concentration of 5 parts per million to 500 parts per million by weight.

In some embodiments, the composition comprises a concentration of molecular oxygen, and the concentration of molecular oxygen is less than 50 micromolar. In some embodiments, the composition comprises a concentration of molecular nitrogen, and the concentration of molecular nitrogen is less than 100 micromolar. The concentration of molecular oxygen, the concentration of molecular nitrogen, or both the concentration of molecular oxygen and the concentration of molecular nitrogen can optionally be reduced, for example, by sparging to decrease the probability that a cannabinoid molecule or an anionic cannabinoid molecule will be oxidized; sparging reduces the concentration of molecular oxygen, and sparging with a gas other than molecular nitrogen (such as a noble gas) reduces the concentration of molecular nitrogen.

In some specific embodiments, the method comprises providing a hermetically-sealed container containing the composition and unsealing the container to provide the composition, in which: the hermetically-sealed container is a glass bottle, plastic bottle, or aluminum can; the container contains 25 milliliters to 800 milliliters of the composition; the composition comprises 50 micrograms to 500 milligrams of the anionic cannabinoid molecule; the composition has a pH; and the pH of the composition is 8.5 to 10.5. In some very specific embodiments, the method comprises providing a hermetically-sealed container containing the composition and unsealing the container to provide the composition, in which: the hermetically-sealed container is a glass bottle, plastic bottle, or aluminum can; the container contains 25 milliliters to 800 milliliters of the composition;

the composition comprises 50 micrograms to 500 milligrams of the anionic cannabinoid molecule; the anionic cannabinoid molecule is 2-[(1R,6R)-6-isopropenyl-3-methylcyclohex-2-en-1-yl]-3-hydroxy-5-pentylphenolate; the composition has a pH; and the pH of the composition is 8.5 to 10.5.

Various aspects of this patent document relate to a method of consuming a cannabinoid, comprising: (i) providing a hermetically-sealed container that contains a composition, in which: the hermetically-sealed container is a glass bottle, plastic bottle, or aluminum can; the container contains 25 milliliters to 800 milliliters of the composition; the composition comprises water and 50 micrograms to 500 milligrams of an anionic cannabinoid molecule; the anionic cannabinoid molecule is dissolved in the water; and the composition has a color; (ii) unsealing the container; (iii) contacting the composition with a Brønsted acid, in which contacting the composition with the Brønsted acid changes the color to either a different color or no color; and (iv) consuming the composition after contacting the composition with the Brønsted acid, in which a human being consumes the composition by drinking it. In some embodiments, the anionic cannabinoid molecule is an anionic cannabinoid molecule according to section I or section II above. In some specific embodiments, the anionic cannabinoid molecule is 2-[(1R,6R)-6-isopropenyl-3-methylcyclohex-2-en-1-yl]-3-hydroxy-5-pentylphenolate. In some specific embodiments, the color is purple. In some very specific embodiments, the anionic cannabinoid molecule is 2-[(1R,6R)-6-isopropenyl-3-methylcyclohex-2-en-1-yl]-3-hydroxy-5-pentylphenolate; and the color is purple.

Various aspects of this patent document relate to a method to change the color of a composition, comprising: (i) providing a container that contains a composition, in which: the composition comprises an anionic cannabinoid molecule dissolved in water; the composition has a color; and the color is purple; and (ii) contacting the composition with a Brønsted acid, in which contacting the composition with the Brønsted acid changes the color from purple to either a different color or no color. In some embodiments, the anionic cannabinoid molecule is an anionic cannabinoid molecule according to section I or section II above. In some specific embodiments, the anionic cannabinoid molecule is 2-[(1R,6R)-6-isopropenyl-3-methylcyclohex-2-en-1-yl]-3-hydroxy-5-pentylphenolate. In some specific embodiments, the Brønsted acid is hydronium, carbonic acid, or citric acid.

IV. Containers Containing Compositions Comprising Anionic Cannabinoid Molecules

Various aspects of this patent document relate to a container, comprising a sealed chamber, in which: the container contains a composition in the sealed chamber; the composition comprises a solvent and an anionic cannabinoid molecule; and the anionic cannabinoid molecule is dissolved in the solvent.

In some embodiments, the composition is a composition according to section I above, and the anionic cannabinoid molecule is an anionic cannabinoid molecule according to section I above. In some embodiments, the composition is a composition according to section II above, and the anionic cannabinoid molecule is an anionic cannabinoid molecule according to section II above.

In some embodiments, the anionic cannabinoid molecule is 2-[(1R,6R)-6-isopropenyl-3-methylcyclohex-2-en-1-yl]-3-hydroxy-5-pentylphenolate. In some specific embodiments, the composition comprises a plurality of anionic cannabinoid molecules; each anionic cannabinoid molecule of the plurality of anionic cannabinoid molecules is dissolved in the water; and the plurality of anionic cannabinoid molecules comprises 2-[(1R,6R)-6-isopropenyl-3-methylcyclohex-2-en-1-yl]-3-hydroxy-5-pentylphenolate and one or more molecules selected from 2-[(1R,6R)-6-isopropenyl-3-methylcyclohex-2-en-1-yl]-3-hydroxy-5-propylphenolate; 2-[(1R,6R)-6-isopropenyl-3-methylcyclohex-3-en-1-yl]-3-hydroxy-5-pentylphenolate; 2-[(1R,6R)-6-isopropenyl-3-methylcyclohex-3-en-1-yl]-3-hydroxy-5-propylphenolate; 2-[(1R,6R)-6-isopropenyl-3-methylcyclohex-2-en-1-yl]-5-pentyl-1,4-benzoquinone-3-oxide; 3-[(1R,6R)-6-isopropenyl-3-methylcyclohex-2-en-1-yl]-6-pentyl-1,2-benzoquinone-4-oxide; 2-[(1R,6R)-6-isopropenyl-3-methylcyclohex-3-en-1-yl]-5-pentyl-1,4-benzoquinone-3-oxide; 3-[(1R,6R)-6-isopropenyl-3-methylcyclohex-3-en-1-yl]-6-pentyl-1,2-benzoquinone-4-oxide; 2-[(1R,6R)-6-isopropenyl-3-methylcyclohex-2-en-1-yl]-5-propyl-1,4-benzoquinone-3-oxide; 3-[(1R,6R)-6-isopropenyl-3-methylcyclohex-2-en-1-yl]-6-propyl-1,2-benzoquinone-4-oxide; 2-[(1R,6R)-6-isopropenyl-3-methylcyclohex-3-en-1-yl]-5-propyl-1,4-benzoquinone-3-oxide; 3-[(1R,6R)-6-isopropenyl-3-methylcyclohex-3-en-1-yl]-6-propyl-1,2-benzoquinone-4-oxide; (6aR,10aR)-6,6,9-trimethyl-3-pentyl-6a,7,8,10a-tetrahydro-6H-benzo[c]chromen-1-oxide; (6aR,10aR)-6,6,9-trimethyl-3-propyl-6a,7,8,10a-tetrahydro-6H-benzo[c]chromen-1-oxide; (6aR,10aR)-6,6,9-trimethyl-3-pentyl-6a,7,10,10a-tetrahydro-6H-benzo[c]chromen-1-oxide; (6aR,10aR)-6,6,9-trimethyl-3-propyl-6a,7,10,10a-tetrahydro-6H-benzo[c]chromen-1-oxide; 2-[(2E)-3,7-dimethylocta-2,6-dienyl]-3-hydroxy-5-pentylphenolate; and 2-[(2E)-3,7-dimethylocta-2,6-dienyl]-3-hydroxy-5-propylphenolate.

In some embodiments, the solvent is a protic polar solvent. In some specific embodiments, the solvent is selected from methanol, ethanol, 1-propanol, 2-propanol, propane-1,2-diol, propane-1,3-diol, propane-1,2,3-triol, 1-butanol, 2-butanol, or butane-1,3-diol. In some very specific embodiments, the solvent is water or ethanol. In some preferred embodiments, the solvent is water.

In some embodiments, the composition has an actual color, and the actual color is purple. In some specific embodiments, the composition has an actual color; the actual color is purple; a label is physically associated with the container; the label comprises an image of a reference color; the reference color is purple; the reference color has a reference shade and a reference intensity; the reference shade is a shade of purple; the actual color has an actual shade and an actual intensity; the actual shade is the shade of purple; and the actual intensity corresponds to the reference intensity. An actual intensity corresponds to a reference intensity if both (i) the actual intensity and the reference intensity are observed by the unaided eyes of a human consumer who has ordinary vision, and (ii) the human consumer determines that the actual intensity and the reference intensity are approximately the same.

In some embodiments, the anionic cannabinoid molecule is dissolved in the water at a concentration of 20 micrograms per liter to 200 grams per liter. In some specific embodiments, the anionic cannabinoid molecule is dissolved in the water at a concentration of 20 micrograms per liter to 2000 milligrams per liter.

In some embodiments, the composition comprises 50 micrograms to 50 kilograms of the anionic cannabinoid molecule. In some specific embodiments, the composition comprises 50 micrograms to 500 milligrams of the anionic cannabinoid molecule.

In some embodiments, the container contains 50 microliters to 500 liters of the composition. In some specific embodiments, the container contains 25 milliliters to 800 milliliters of the composition.

In some embodiments, the composition has a pH, and the pH is 8.0 to 15.5. In some specific embodiments, the composition has a pH, and the pH is 8.5 to 10.5.

In some embodiments, the composition comprises ethanol at a concentration of at least 5 parts per billion and no greater than 99.99 percent by weight. In some specific embodiments, the composition comprises ethanol at a concentration of 5 parts per million to 500 parts per million by weight.

In some embodiments, the composition comprises a concentration of molecular oxygen, and the concentration of molecular oxygen is less than 50 micromolar. In some embodiments, the composition comprises a concentration of molecular nitrogen, and the concentration of molecular nitrogen is less than 100 micromolar.

In some embodiments, the composition comprises hydroxide at a concentration of 100 nanomolar to 5 molar. In some specific embodiments, the composition comprises hydroxide at a concentration of 1 micromolar to 100 micromolar.

In some embodiments, the sealed chamber is hermetically-sealed.

In some embodiments, the container is a glass bottle, a plastic bottle, or an aluminum can.

In some embodiments, the composition comprises 50 micrograms to 500 milligrams of the anionic cannabinoid molecule; the composition comprises the anionic cannabinoid molecule at a concentration of 100 micrograms per liter to 1000 milligrams per liter; 25 milliliters to 800 milliliters of the composition are contained within the container; the composition has a pH; and the pH is 8.5 to 10.5.

In some embodiments, the composition comprises 200 micrograms to 200 milligrams of the anionic cannabinoid molecule; 250 milliliters to 600 milliliters of the composition are contained within the container; the composition has a pH; the pH is 8.5 to 10.5; the sealed chamber is hermetically-sealed; the composition has a color; and the color of the composition is purple.

V. Methods of Preparing Anionic Cannabinoid Molecules Dissolved in Water

Various aspects of this patent document relate to a method to solubilize a cannabinoid in water, comprising: providing a cannabinoid molecule, in which the cannabinoid molecule comprises an aromatic ring and a hydroxyl group, and the hydroxyl group is a substituent on the aromatic ring; providing a Brønsted base and a solvent; providing water; contacting the cannabinoid molecule with the Brønsted base and the solvent to deprotonate the hydroxyl group and to produce an anionic cannabinoid molecule; and dissolving the anionic cannabinoid molecule in the water to produce a solution comprising the anionic cannabinoid molecule, in which the solution comprising the anionic cannabinoid molecule has a pH of at least 8.5.

In some embodiments, either the cannabinoid molecule is 2-[6-isopropenyl-3-methylcyclohex-2-en-1-yl]-5-alkylbenzene-1,3-diol, and the anionic cannabinoid molecule is 2-[6-isopropenyl-3-methylcyclohex-2-en-1-yl]-3-hydroxy-5-alkylphenolate; the cannabinoid molecule is 3-alkyl-6,6,9-trimethyl-6a,7,8,10a-tetrahydro-6H-benzo[c]chromen-1-ol, and the anionic cannabinoid molecule is 3-alkyl-6,6,9-trimethyl-6a,7,8,10a-tetrahydro-6H-benzo[c]chromen-1-oxide; the cannabinoid molecule is 2-[3,7-dimethylocta-2,6-diene-1-yl]-5-alkylbenzene-1,3-diol, and the anionic cannabinoid molecule is 2-[3,7-dimethylocta-2,6-diene-1-yl]-3-hydroxy-5-alkylphenolate; the cannabinoid molecule is 2-methyl-2-(4-methylpent-3-en-1-yl)-5-hydroxy-7-alkyl-2H-1-benzopyran, and the anionic cannabinoid molecule is 2-methyl-2-(4-methylpent-3-en-1-yl)-7-alkyl-2H-1-benzopyran-5-oxide; the cannabinoid molecule is 3-alkyl-6,6,9-trimethyl-6H-benzo[c]chromen-1-ol, and the anionic cannabinoid molecule is 3-alkyl-6,6,9-trimethyl-6H-benzo[c]chromen-1-oxide; the cannabinoid molecule is 3-alkyl-6,6-dimethyl-9-(hydroxymethyl)-6a,7,8,10a-tetrahydro-6H-benzo[c]chromen-1-ol, and the anionic cannabinoid molecule is 3-alkyl-6,6-dimethyl-9-(hydroxymethyl)-6a,7,8,10a-tetrahydro-6H-benzo[c]chromen-1-oxide; or the cannabinoid molecule is 1-hydroxy-3-alkyl-6,6-dimethyl-6,6a,7,8,10,10a-hexahydro-9H-benzo[c]chromen-9-one, and the anionic cannabinoid molecule is 3-alkyl-6,6-dimethyl-9-oxo-6,6a,7,8,10,10a-hexahydro-9H-benzo[c]chromen-1-oxide.

In some specific embodiments, either the cannabinoid molecule is 2-[(1R,6R)-6-isopropenyl-3-methylcyclohex-2-en-1-yl]-5-alkylbenzene-1,3-diol, and the anionic cannabinoid molecule is 2-[(1R,6R)-6-isopropenyl-3-methylcyclohex-2-en-1-yl]-3-hydroxy-5-alkylphenolate; the cannabinoid molecule is (6aR,10aR)-3-alkyl-6,6,9-trimethyl-6a,7,8,10a-tetrahydro-6H-benzo[c]chromen-1-ol, and the anionic cannabinoid molecule is (6aR,10aR)-3-alkyl-6,6,9-trimethyl-6a,7,8,10a-tetrahydro-6H-benzo[c]chromen-1-oxide; the cannabinoid molecule is 2-[(2E)-3,7-dimethylocta-2,6-diene-1-yl]-5-alkylbenzene-1,3-diol, and the anionic cannabinoid molecule is 2-[(2E)-3,7-dimethylocta-2,6-diene-1-yl]-3-hydroxy-5-alkylphenolate; the cannabinoid molecule is 2-methyl-2-(4-methylpent-3-en-1-yl)-5-hydroxy-7-alkyl-2H-1-benzopyran, and the anionic cannabinoid molecule is 2-methyl-2-(4-methylpent-3-en-1-yl)-7-alkyl-2H-1-benzopyran-5-oxide; the cannabinoid molecule is 3-alkyl-6,6,9-trimethyl-6H-benzo[c]chromen-1-ol, and the anionic cannabinoid molecule is 3-alkyl-6,6,9-trimethyl-6H-benzo[c]chromen-1-oxide; the cannabinoid molecule is (6aR,10aR)-3-alkyl-6,6-dimethyl-9-(hydroxymethyl)-6a,7,8,10a-tetrahydro-6H-benzo[c]chromen-1-ol, and the anionic cannabinoid molecule is (6aR,10aR)-3-alkyl-6,6-dimethyl-9-(hydroxymethyl)-6a,7,8,10a-tetrahydro-6H-benzo[c]chromen-1-oxide; or the cannabinoid molecule is (6aR,10aR)-1-hydroxy-3-alkyl-6,6-dimethyl-6,6a,7,8,10,10a-hexahydro-9H-benzo[c]chromen-9-one, and the anionic cannabinoid molecule is (6aR,10aR)-3-alkyl-6,6-dimethyl-9-oxo-6,6a,7,8,10,10a-hexahydro-9H-benzo[c]chromen-1-oxide.

In some specific embodiments, the cannabinoid molecule is 2-[6-isopropenyl-3-methylcyclohex-2-en-1-yl]-5-pentylbenzene-1,3-diol, and the anionic cannabinoid molecule is 2-[6-isopropenyl-3-methylcyclohex-2-en-1-yl]-3-hydroxy-5-pentylphenolate; the cannabinoid molecule is 3-pentyl-6,6,9-trimethyl-6a,7,8,10a-tetrahydro-6H-benzo[c]chromen-1-ol, and the anionic cannabinoid molecule is 3-pentyl-6,6,9-trimethyl-6a,7,8,10a-tetrahydro-6H-benzo[c]chromen-1-oxide; the cannabinoid molecule is 2-[3,7-dimethylocta-2,6-diene-1-yl]-5-pentylbenzene-1,3-diol, and the anionic cannabinoid molecule is 2-[3,7-dimethylocta-2,6-diene-1-yl]-3-hydroxy-5-pentylphenolate; the cannabinoid molecule is 2-methyl-2-(4-methylpent-3-en-1-yl)-5-hydroxy-7-pentyl-2H-1-benzopyran, and the anionic cannabinoid molecule is 2-methyl-2-(4-methylpent-3-en-1-yl)-7-pentyl-2H-1-benzopyran-5-oxide; the cannabinoid molecule is 3-pentyl-6,6,9-trimethyl-6H-benzo[c]chromen-1-ol, and the anionic cannabinoid molecule is 3-pentyl-6,6,9-trimethyl-6H-benzo[c]chromen-1-oxide; the cannabinoid molecule is 3-pentyl-6, 6-dimethyl-9-(hydroxymethyl)-6a,7,8,10a-tetrahydro-6H-benzo[c]chromen-1-ol, and the anionic cannabinoid molecule is 3-pentyl-6,6-dimethyl-9-(hydroxymethyl)-6a,7,8,10a-tetrahydro-6H-benzo[c]chromen-1-oxide; the cannabinoid molecule is 2-[6-isopropenyl-3-methylcyclohex-2-en-1-yl]-5-propylbenzene-1,3-diol, and the anionic cannabinoid molecule is 2-[6-isopropenyl-3-methylcyclohex-2-en-1-yl]-3-hydroxy-5-propylphenolate; the cannabinoid molecule is 3-propyl-6,6,9-trimethyl-6a,7,8,10a-tetrahydro-6H-benzo[c]chromen-1-ol, and the anionic cannabinoid molecule is 3-propyl-6,6,9-trimethyl-6a,7,8,10a-tetrahydro-6H-benzo[c]chromen-1-oxide; the cannabinoid molecule is 2-[3,7-dimethylocta-2,6-diene-1-yl]-5-propylbenzene-1,3-diol, and the anionic cannabinoid molecule is 2-[3,7-dimethylocta-2,6-diene-1-yl]-3-hydroxy-5-propylphenolate; the cannabinoid molecule is 2-methyl-2-(4-methylpent-3-en-1-yl)-5-hydroxy-7-propyl-2H-1-benzopyran, and the anionic cannabinoid molecule is 2-methyl-2-(4-methylpent-3-en-1-yl)-7-propyl-2H-1-benzopyran-5-oxide; the cannabinoid molecule is 3-propyl-6,6,9-trimethyl-6H-benzo[c]chromen-1-ol, and the anionic cannabinoid molecule is 3-propyl-6,6,9-trimethyl-6H-benzo[c]chromen-1-oxide; the cannabinoid molecule is 3-propyl-6,6-dimethyl-9-(hydroxymethyl)-6a,7,8,10a-tetrahydro-6H-benzo[c]chromen-1-ol, and the anionic cannabinoid molecule is 3-propyl-6,6-dimethyl-9-(hydroxymethyl)-6a,7,8,10a-tetrahydro-6H-benzo[c]chromen-1-oxide; or the cannabinoid molecule is 1-hydroxy-3-(2-methyloct-2-yl)-6,6-dimethyl-6,6a,7,8,10,10a-hexahydro-9H-benzo[c]chromen-9-one, and the anionic cannabinoid molecule is 3-(2-methyloct-2-yl)-6,6-dimethyl-9-oxo-6,6a,7,8,10,10a-hexahydro-9H-benzo[c]chromen-1-oxide.

In some very specific embodiments, the cannabinoid molecule is 2-[(1R,6R)-6-isopropenyl-3-methylcyclohex-2-en-1-yl]-5-pentylbenzene-1,3-diol, and the anionic cannabinoid molecule is 2-[(1R,6R)-6-isopropenyl-3-methylcyclohex-2-en-1-yl]-3-hydroxy-5-pentylphenolate; the cannabinoid molecule is (6aR,10aR)-3-pentyl-6,6,9-trimethyl-6a,7,8,10a-tetrahydro-6H-benzo[c]chromen-1-ol, and the anionic cannabinoid molecule is (6aR,10aR)-3-pentyl-6,6,9-trimethyl-6a,7,8,10a-tetrahydro-6H-benzo[c]chromen-1-oxide; the cannabinoid molecule is 2-[(2E)-3,7-dimethylocta-2,6-diene-1-yl]-5-pentylbenzene-1,3-diol, and the anionic cannabinoid molecule is 2-[(2E)-3,7-dimethylocta-2,6-diene-1-yl]-3-hydroxy-5-pentylphenolate; the cannabinoid molecule is 2-methyl-2-(4-methylpent-3-en-1-yl)-5-hydroxy-7-pentyl-2H-1-benzopyran, and the anionic cannabinoid molecule is 2-methyl-2-(4-methylpent-3-en-1-yl)-7-pentyl-2H-1-benzopyran-5-oxide; the cannabinoid molecule is 3-pentyl-6,6,9-trimethyl-6H-benzo[c]chromen-1-ol, and the anionic cannabinoid molecule is 3-pentyl-6,6,9-trimethyl-6H-benzo[c]chromen-1-oxide; the cannabinoid molecule is (6aR,10aR)-3-pentyl-6,6-dimethyl-9-(hydroxymethyl)-6a,7,8,10a-tetrahydro-6H-benzo[c]chromen-1-ol, and the anionic cannabinoid molecule is (6aR,10aR)-3-pentyl-6,6-dimethyl-9-(hydroxymethyl)-6a,7,8,10a-tetrahydro-6H-benzo[c]chromen-1-oxide; the cannabinoid molecule is 2-[(1R,6R)-6-isopropenyl-3-methylcyclohex-2-en-1-yl]-5-propylbenzene-1,3-diol, and the anionic cannabinoid molecule is 2-[(1R,6R)-6-isopropenyl-3-methylcyclohex-2-en-1-yl]-3-hydroxy-5-propylphenolate; the cannabinoid molecule is (6aR,10aR)-3-propyl-6,6,9-trimethyl-6a,7,8,10a-tetrahydro-6H-benzo[c]chromen-1-ol, and the anionic cannabinoid molecule is (6aR,10aR)-3-propyl-6,6,9-trimethyl-6a,7,8,10a-tetrahydro-6H-benzo[c]chromen-1-oxide; the cannabinoid molecule is 2-[(2E)-3,7-dimethylocta-2,6-diene-1-yl]-3-hydroxy-5-propylphenolate; the cannabinoid molecule is 2-methyl-2-(4-methylpent-3-en-1-yl)-5-hydroxy-7-propyl-2H-1-benzopyran, and the anionic cannabinoid molecule is 2-methyl-2-(4-methylpent-3-en-1-yl)-7-propyl-2H-1-benzopyran-5-oxide; the cannabinoid molecule is 3-propyl-6,6,9-trimethyl-6H-benzo[c]chromen-1-ol, and the anionic cannabinoid molecule is 3-propyl-6,6,9-trimethyl-6H-benzo[c]chromen-1-oxide; the cannabinoid molecule is (6aR,10aR)-3-propyl-6,6-dimethyl-9-(hydroxymethyl)-6a,7,8,10a-tetrahydro-6H-benzo[c]chromen-1-ol, and the anionic cannabinoid molecule is (6aR,10aR)-3-propyl-6,6-dimethyl-9-(hydroxymethyl)-6a,7,8,10a-tetrahydro-6H-benzo[c]chromen-1-oxide; or the cannabinoid molecule is (6aR,10aR)-1-hydroxy-3-(2-methyloct-2-yl)-6,6-dimethyl-6,6a,7,8,10,10a-hexahydro-9H-benzo[c]chromen-9-one, and the anionic cannabinoid molecule is (6aR,10aR)-3-(2-methyloct-2-yl)-6,6-dimethyl-9-oxo-6,6a,7,8,10,10a-hexahydro-9H-benzo[c]chromen-1-oxide.

In some embodiments, alkyl consists of hydrogen, carbon, oxygen, and halogen atoms. In some specific embodiments, alkyl consists of 0 to 9 carbon atoms and 1 to 19 hydrogen atoms. In some very specific embodiments, alkyl is hydro, methyl, ethyl, prop-1-yl, but-1-yl, pent-1-yl, hex-1-yl, hept-1-yl, oct-1-yl, prop-2-yl, but-2-yl, pent-2-yl, hex-2-yl, hept-2-yl, oct-2-yl, 2-methylprop-2-yl, 2-methylbut-2-yl, 2-methylpent-2-yl, 2-methylhex-2-yl, 2-methylhept-2-yl, 2-methyloct-2-yl, 3-methylprop-2-yl, 3-methylbut-2-yl, 3-methylpent-2-yl, 3-methylhex-2-yl, 3-methylhept-2-yl, 3-methyloct-2-yl, or 2-phenyleth-1-yl. In some preferred embodiments, alkyl is prop-1-yl or pent-1-yl.

In some embodiments, the cannabinoid molecule is cannabidiol, and the anionic cannabinoid molecule is selected from the group consisting of: 2-[(1R,6R)-6-isopropenyl-3-methylcyclohex-2-en-1-yl]-3-hydroxy-5-pentylphenolate; 2-[(1R,6R)-6-isopropenyl-3-methylcyclohex-3-en-1-yl]-3-hydroxy-5-pentylphenolate; 2-[(1R,6R)-6-isopropenyl-3-methylcyclohex-2-en-1-yl]-5-pentyl-1,4-benzoquinone-3-oxide; 3-[(1R,6R)-6-isopropenyl-3-methylcyclohex-2-en-1-yl]-6-pentyl-1,2-benzoquinone-4-oxide; 2-[(1R,6R)-6-isopropenyl-3-methylcyclohex-3-en-1-yl]-5-pentyl-1,4-benzoquinone-3-oxide; 3-[(1R,6R)-6-isopropenyl-3-methylcyclohex-3-en-1-yl]-6-pentyl-1,2-benzoquinone-4-oxide; and (6aR,10aR)-6,6,9-trimethyl-3-pentyl-6a,7,10,10a-tetrahydro-6H-benzo[c]chromen-1-oxide. In some very specific embodiments, the cannabinoid molecule is cannabidiol, and the anionic cannabinoid molecule is 2-[(1R,6R)-6-isopropenyl-3-methylcyclohex-2-en-1-yl]-3-hydroxy-5-pentylphenolate. Cannabidiol is a common name for 2-[(1R,6R)-6-isopropenyl-3-methylcyclohex-2-en-1-yl]-5-pentylbenzene-1,3-diol.

In some embodiments, the solvent is selected from methanol, ethanol, 1-propanol, 2-propanol, propane-1,2-diol, propane-1,3-diol, 1-butanol, 2-butanol, and butane-1,3-diol. In some specific embodiments, the solvent is ethanol.

The term "Brønsted base" refers to a proton acceptor. In some embodiments, the Brønsted base is hydroxide, methoxide, ethoxide, propane-1-oxide, propane-2-oxide, 1-hydroxypropane-2-oxide, 2-hydroxypropane-1-oxide, 1-hydroxypropane-3-oxide, 3-hydroxypropane-1-oxide, butane-1-oxide, butane-2-oxide, 1-hydroxybutane-3-oxide, and 3-hydroxybutane-1-oxide. In some specific embodiments, the Brønsted base is ethoxide or hydroxide.

In some embodiments, either (i) the cannabinoid molecule, (ii) the Brønsted base, or (iii) both the cannabinoid molecule and the Brønsted base are dissolved in a solvent when the cannabinoid molecule and the Brønsted base are contacted with each other.

In some embodiments, the solution has an ethanol concentration, and the method comprises adjusting the ethanol concentration of the solution to an ethanol concentration no greater than 1 percent by weight. In some specific embodiments, the solution has an ethanol concentration, and the method comprises adjusting the ethanol concentration of the solution to an ethanol concentration no greater than 0.05 percent by weight.

In some embodiments, the solvent has a dissolved oxygen concentration, and the method comprises reducing the dissolved oxygen concentration of the solvent prior to contacting the cannabinoid molecule with the Brønsted base. In some embodiments, the water has a dissolved oxygen concentration, and the method comprises reducing the dissolved oxygen concentration of the water prior to dissolving the anionic cannabinoid molecule in the water.

In some embodiments, the water has a pH, and the pH is greater than 6.5. In some specific embodiments, the water has a pH, and the pH is greater than 9.5.

In some embodiments, the solution comprising the anionic cannabinoid molecule has a pH, and the method comprises adjusting the pH to 8.0 to 15.5. In some specific embodiments, the solution comprising the anionic cannabinoid molecule has a pH, and the method comprises adjusting the pH to 8.5 to 10.5.

In some embodiments, the method comprises adjusting a concentration of the anionic cannabinoid molecule in the solution to a concentration of 20 micrograms per liter to 200 grams per liter. In some specific embodiments, the method comprises adjusting a concentration of the anionic cannabinoid molecule in the solution to a concentration of 20 micrograms per liter to 2000 milligrams per liter.

In some embodiments, the method results in a lipid phase in fluid communication with the solution comprising the anionic cannabinoid molecule, and the method comprises separating the lipid phase from the solution.

In some embodiments, the method comprises inserting the solution comprising the anionic cannabinoid molecule into a container and then hermetically sealing the container. In some specific embodiments, the method comprises inserting 50 microliters to 500 liters of the solution into the container and then hermetically sealing the container. In some very specific embodiments, the method comprises inserting 25 milliliters to 800 milliliters of the solution into the container and then hermetically sealing the container.

In some embodiments, the method comprises transferring ownership of the container and receiving payment for transferring ownership of the container.

In some specific embodiments, the Brønsted base is dissolved in a solvent when the cannabinoid molecule and the Brønsted base are contacted with each other; the solvent is ethanol; the Brønsted base is hydroxide or ethoxide; the water has a pH; the pH of the water is greater than 9.5; the solution comprising the anionic cannabinoid molecule has a pH; either the pH of the solution is 8.5 to 10.5, or the method comprises adjusting the pH of the solution to 8.5 to 10.5; and the method comprises inserting the solution comprising the anionic cannabinoid molecule into a container and then hermetically sealing the container.

In some embodiments, the cannabinoid molecule is cannabidiol; and the anionic cannabinoid molecule is 2-[(1R, 6R)-6-isopropenyl-3-methylcyclohex-2-en-1-yl]-3-hydroxy-5-pentylphenolate;

VI. Compositions Comprising Both an Anionic Cannabinoid Molecule and its Conjugate Acid Various aspects of this patent document relate to a liquid composition, comprising a cannabinoid molecule, an anionic cannabinoid molecule, water, and one or more of sodium ion ($Na^+$), potassium ion ($K^+$), calcium ion ($Ca^{2+}$), magnesium ion ($Mg^{2+}$), chloride ion ($Cl^-$), sulfate ($SO_4^{2-}$), bicarbonate ($HCO_3^-$), and carbonate ($CO_3^{2-}$); wherein: the anionic cannabinoid molecule is dissolved in the water; the anionic cannabinoid molecule has a conjugate acid, and the conjugate acid is the cannabinoid molecule; and the liquid composition comprises the anionic cannabinoid molecule and the cannabinoid molecule at a molar ratio of 1:10 to 1,000,000:1.

Various aspects of this patent document relate to a composition, comprising an anionic cannabinoid molecule and a cannabinoid molecule at a molar ratio of 1:10 to 1,000,000:1, and further comprising one or more of sodium ion ($Na^+$), potassium ion ($K^+$), calcium ion ($Ca^{2+}$), magnesium ion ($Mg^{2+}$), chloride ion ($Cl^-$), sulfate ($SO_4^{2-}$), bicarbonate ($HCO_3^-$), and carbonate ($CO_3^{2-}$), wherein the anionic cannabinoid molecule has a conjugate acid, and the conjugate acid is the cannabinoid molecule.

In some embodiments, the composition has a pH, and the pH of the composition is 7 to 15. In some specific embodiments, the pH of the composition is 7 to 13. In some very specific embodiments, the pH of the composition is 8 to 10.

In some specific embodiments, the composition comprises the anionic cannabinoid molecule and the cannabinoid molecule at a molar ratio of 1:10 to 10,000:1. In some very specific embodiments, the composition comprises the anionic cannabinoid molecule and the cannabinoid molecule at a molar ratio of 1:1 to 100:1.

In some embodiments, the composition comprises water. In some specific embodiments, the composition comprises water at a concentration by weight of 50 percent to 99.99 percent.

In some embodiments, the composition comprises ethanol. In some specific embodiments, the composition comprises ethanol at a concentration by weight of 5 parts per billion to 99.99 percent. In some very specific embodiments, the composition comprises ethanol at a concentration by weight of 50 parts per million to 2 percent. In some very specific embodiments, the composition comprises ethanol at a concentration by weight of 1 percent to 20 percent. In some very specific embodiments, the composition comprises ethanol at a concentration by weight of 10 percent to 95 percent.

In some embodiments, the composition comprises the anionic cannabinoid molecule at a concentration of 1 milligram per liter to 100 milligrams per liter. In some embodiments, the composition comprises the anionic cannabinoid molecule at a concentration of 50 milligrams per liter to 5 grams per liter. In some embodiments, the composition comprises the anionic cannabinoid molecule at a concentration of 2 grams per liter to 200 grams per liter.

In some embodiments, the composition comprises one or more of caffeine, thiamine, niacin, nicotinamide, riboflavin, pantothenate, sucrose, fructose, glucose, acesulfame, saccharin, stevioside, rebaudioside A, sucralose, tagatose, erythritol, maltitol, xylitol, mannitol, isomalt, and a mogroside.

Various aspects of this patent document relate to a composition, comprising an anionic cannabinoid molecule and a cannabinoid molecule at a molar ratio of 1:10 to 10,000:1, wherein: the anionic cannabinoid molecule has a conjugate acid, and the conjugate acid is the cannabinoid molecule; the composition comprises a solid phase; the solid phase comprises a salt; and the salt comprises the anionic cannabinoid molecule.

In some embodiments, the salt comprises a cation selected from sodium ion ($Na^+$), potassium ion ($K^+$), calcium ion ($Ca^{2+}$), and magnesium ion ($Mg^{2+}$). In some specific embodiments, the salt comprises sodium ion or potassium ion.

Various aspects of this patent document relate to a composition, comprising an anionic cannabinoid molecule and a cannabinoid molecule at a molar ratio of 10,000:1 to 1,000,000:1, and further comprising one or more of sodium ion ($Na^+$), potassium ion ($K^+$), calcium ion ($Ca^{2+}$), magnesium ion ($Mg^{2+}$), chloride ion ($Cl^-$), sulfate ($SO_4^{2-}$), bicarbonate ($HCO_3^-$), and carbonate ($CO_3^{2-}$), wherein the anionic cannabinoid molecule has a conjugate acid, and the conjugate acid is the cannabinoid molecule.

In some embodiments, the cannabinoid molecule is 2-[6-isopropenyl-3-methylcyclohex-2-en-1-yl]-5-alkylbenzene-1,3-diol, and the anionic cannabinoid molecule is 2-[6-isopropenyl-3-methylcyclohex-2-en-1-yl]-3-hydroxy-5-alkylphenolate; the cannabinoid molecule is 3-alkyl-6,6,9-trimethyl-6a,7,8,10a-tetrahydro-6H-benzo[c]chromen-1-ol, and the anionic cannabinoid molecule is 3-alkyl-6,6,9-trimethyl-6a,7,8,10a-tetrahydro-6H-benzo[c]chromen-1-oxide; the cannabinoid molecule is 2-[3,7-dimethylocta-2,6-diene-1-yl]-5-alkylbenzene-1,3-diol, and the anionic cannabinoid molecule is 2-[3,7-dimethylocta-2,6-diene-1-yl]-3-hydroxy-5-alkylphenolate; the cannabinoid molecule is 2-methyl-2-(4-methylpent-3-en-1-yl)-5-hydroxy-7-alkyl-2H-1-benzopyran, and the anionic cannabinoid molecule is 2-methyl-2-(4-methylpent-3-en-1-yl)-7-alkyl-2H-1-benzopyran-5-oxide; the cannabinoid molecule is 3-alkyl-6,6,9-trimethyl-6H-benzo[c]chromen-1-ol, and the anionic cannabinoid molecule is 3-alkyl-6,6,9-trimethyl-6H-benzo[c]chromen-1-oxide; the cannabinoid molecule is 3-alkyl-6,6-dimethyl-9-(hydroxymethyl)-6a,7,8,10a-tetrahydro-6H-benzo[c]chromen-1-ol, and the anionic cannabinoid molecule is 3-alkyl-6,6-dimethyl-9-(hydroxymethyl)-6a,7,8,10a-tetrahydro-6H-benzo[c]chromen-1-oxide; or the cannabinoid molecule is 1-hydroxy-3-alkyl-6,6-dimethyl-6,6a,7,8,10,10a-hexahydro-9H-benzo[c]chromen-9-one, and the anionic cannabinoid molecule is 3-alkyl-6,6-dimethyl-9-oxo-6,6a,7,8,10,10a-hexahydro-9H-benzo[c]chromen-1-oxide.

In some specific embodiments, the cannabinoid molecule is 2-[(1R,6R)-6-isopropenyl-3-methylcyclohex-2-en-1-yl]-5-alkylbenzene-1,3-diol, and the anionic cannabinoid molecule is 2-[(1R,6R)-6-isopropenyl-3-methylcyclohex-2-en-1-yl]-3-hydroxy-5-alkylphenolate; the cannabinoid molecule is (6aR,10aR)-3-alkyl-6,6,9-trimethyl-6a,7,8,10a-tetrahydro-6H-benzo[c]chromen-1-ol, and the anionic cannabinoid molecule is (6aR,10aR)-3-alkyl-6,6,9-trimethyl-6a,7,8,10a-tetrahydro-6H-benzo[c]chromen-1-oxide; the cannabinoid molecule is 2-[(2E)-3,7-dimethylocta-2,6-diene-1-yl]-5-alkylbenzene-1,3-diol, and the anionic cannabinoid molecule is 2-[(2E)-3,7-dimethylocta-2,6-diene-1-yl]-3-hydroxy-5-alkylphenolate; the cannabinoid molecule is 2-methyl-2-(4-methylpent-3-en-1-yl)-5-hydroxy-7-alkyl-2H-1-benzopyran, and the anionic cannabinoid molecule is 2-methyl-2-(4-methylpent-3-en-1-yl)-7-alkyl-2H-1-benzopyran-5-oxide; the cannabinoid molecule is 3-alkyl-6,6,9-trimethyl-6H-benzo[c]chromen-1-ol, and the anionic cannabinoid molecule is 3-alkyl-6,6,9-trimethyl-6H-benzo[c]chromen-1-oxide; the cannabinoid molecule is (6aR,10aR)-3-alkyl-6,6-dimethyl-9-(hydroxymethyl)-6a,7,8,10a-tetrahydro-6H-benzo[c]chromen-1-ol, and the anionic cannabinoid molecule is (6aR,10aR)-3-alkyl-6,6-dimethyl-9-(hydroxymethyl)-6a,7,8,10a-tetrahydro-6H-benzo[c]chromen-1-oxide; or the cannabinoid molecule is (6aR,10aR)-1-hydroxy-3-alkyl-6,6-dimethyl-6,6a,7,8,10,10a-hexahydro-9H-benzo[c]chromen-9-one, and the anionic cannabinoid molecule is (6aR,10aR)-3-alkyl-6,6-dimethyl-9-oxo-6,6a,7,8,10,10a-hexahydro-9H-benzo[c]chromen-1-oxide.

In some specific embodiments, the cannabinoid molecule is 2-[6-isopropenyl-3-methylcyclohex-2-en-1-yl]-5-pentyl-benzene-1,3-diol, and the anionic cannabinoid molecule is 2-[6-isopropenyl-3-methylcyclohex-2-en-1-yl]-3-hydroxy-5-pentylphenolate; the cannabinoid molecule is 3-pentyl-6,6,9-trimethyl-6a,7,8,10a-tetrahydro-6H-benzo[c]chromen-1-ol, and the anionic cannabinoid molecule is 3-pentyl-6,6,9-trimethyl-6a,7,8,10a-tetrahydro-6H-benzo[c]chromen-1-oxide; the cannabinoid molecule is 2-[3,7-dimethylocta-2,6-diene-1-yl]-5-pentylbenzene-1,3-diol, and the anionic cannabinoid molecule is 2-[3,7-dimethylocta-2,6-diene-1-yl]-3-hydroxy-5-pentylphenolate; the cannabinoid molecule is 2-methyl-2-(4-methylpent-3-en-1-yl)-5-hydroxy-7-pentyl-2H-1-benzopyran, and the anionic cannabinoid molecule is 2-methyl-2-(4-methylpent-3-en-1-yl)-7-pentyl-2H-1-benzopyran-5-oxide; the cannabinoid molecule is 3-pentyl-6,6,9-trimethyl-6H-benzo[c]chromen-1-ol, and the anionic cannabinoid molecule is 3-pentyl-6,6,9-trimethyl-6H-benzo[c]chromen-1-oxide; the cannabinoid molecule is 3-pentyl-6,6-dimethyl-9-(hydroxymethyl)-6a,7,8,10a-tetrahydro-6H-benzo[c]chromen-1-ol, and the anionic cannabinoid molecule is 3-pentyl-6,6-dimethyl-9-(hydroxymethyl)-6a,7,8,10a-tetrahydro-6H-benzo[c]chromen-1-oxide; the cannabinoid molecule is 2-[6-isopropenyl-3-methylcyclohex-2-en-1-yl]-5-propylbenzene-1,3-diol, and the anionic cannabinoid molecule is 2-[6-isopropenyl-3-methylcyclohex-2-en-1-yl]-3-hydroxy-5-propylphenolate; the cannabinoid molecule is 3-propyl-6,6,9-trimethyl-6a,7,8,10a-tetrahydro-6H-benzo[c]chromen-1-ol, and the anionic cannabinoid molecule is 3-propyl-6,6,9-trimethyl-6a,7,8,10a-tetrahydro-6H-benzo[c]chromen-1-oxide; the cannabinoid molecule is 2-[3,7-dimethylocta-2,6-diene-1-yl]-5-propylbenzene-1,3-diol, and the anionic cannabinoid molecule is 2-[3,7-dimethylocta-2,6-diene-1-yl]-3-hydroxy-5-propylphenolate; the cannabinoid molecule is 2-methyl-2-(4-methylpent-3-en-1-yl)-5-hydroxy-7-propyl-2H-1-benzopyran, and the anionic cannabinoid molecule is 2-methyl-2-(4-methylpent-3-en-1-yl)-7-propyl-2H-1-benzopyran-5-oxide; the cannabinoid molecule is 3-propyl-6,6,9-trimethyl-6H-benzo[c]chromen-1-ol, and the anionic cannabinoid molecule is 3-propyl-6,6,9-trimethyl-6H-benzo[c]chromen-1-oxide; the cannabinoid molecule is 3-propyl-6,6-dimethyl-9-(hydroxymethyl)-6a,7,8,10a-tetrahydro-6H-benzo[c]chromen-1-ol, and the anionic cannabinoid molecule is 3-propyl-6,6-dimethyl-9-(hydroxymethyl)-6a,7,8,10a-tetrahydro-6H-benzo[c]chromen-1-oxide; or the cannabinoid molecule is 1-hydroxy-3-(2-methyloct-2-yl)-6,6-dimethyl-6,6a,7,8,10,10a-hexahydro-9H-benzo[c]chromen-9-one, and the anionic cannabinoid molecule is 3-(2-methyloct-2-yl)-6,6-dimethyl-9-oxo-6,6a,7,8,10,10a-hexahydro-9H-benzo[c]chromen-1-oxide.

In some very specific embodiments, the cannabinoid molecule is 2-[(1R,6R)-6-isopropenyl-3-methylcyclohex-2-en-1-yl]-5-pentylbenzene-1,3-diol, and the anionic cannabinoid molecule is 2-[(1R,6R)-6-isopropenyl-3-methylcyclohex-2-en-1-yl]-3-hydroxy-5-pentylphenolate; the cannabinoid molecule is (6aR,10aR)-3-pentyl-6,6,9-trimethyl-6a,7,8,10a-tetrahydro-6H-benzo[c]chromen-1-ol, and the anionic cannabinoid molecule is (6aR,10aR)-3-pentyl-6,6,9-trimethyl-6a,7,8,10a-tetrahydro-6H-benzo[c]

chromen-1-oxide; the cannabinoid molecule is 2-[(2E)-3,7-dimethylocta-2,6-diene-1-yl]-5-pentylbenzene-1,3-diol, and the anionic cannabinoid molecule is 2-[(2E)-3,7-dimethyl-octa-2,6-diene-1-yl]-3-hydroxy-5-pentylphenolate; the cannabinoid molecule is 2-methyl-2-(4-methylpent-3-en-1-yl)-5-hydroxy-7-pentyl-2H-1-benzopyran, and the anionic cannabinoid molecule is 2-methyl-2-(4-methylpent-3-en-1-yl)-7-pentyl-2H-1-benzopyran-5-oxide; the cannabinoid molecule is 3-pentyl-6,6,9-trimethyl-6H-benzo[c]chromen-1-ol, and the anionic cannabinoid molecule is 3-pentyl-6,6,9-trimethyl-6H-benzo[c]chromen-1-oxide; the cannabinoid molecule is (6aR,10aR)-3-pentyl-6,6-dimethyl-9-(hydroxymethyl)-6a,7,8,10a-tetrahydro-6H-benzo[c]chromen-1-ol, and the anionic cannabinoid molecule is (6aR,10aR)-3-pentyl-6,6-dimethyl-9-(hydroxymethyl)-6a,7,8,10a-tetrahydro-6H-benzo[c]chromen-1-oxide; the cannabinoid molecule is 2-[(1R,6R)-6-isopropenyl-3-methylcyclohex-2-en-1-yl]-5-propylbenzene-1,3-diol, and the anionic cannabinoid molecule is 2-[(1R,6R)-6-isopropenyl-3-methylcyclohex-2-en-1-yl]-3-hydroxy-5-propylphenolate; the cannabinoid molecule is (6aR,10aR)-3-propyl-6,6,9-trimethyl-6a,7,8,10a-tetrahydro-6H-benzo[c]chromen-1-ol, and the anionic cannabinoid molecule is (6aR,10aR)-3-propyl-6,6,9-trimethyl-6a,7,8,10a-tetrahydro-6H-benzo[c]chromen-1-oxide; the cannabinoid molecule is 2-[(2E)-3,7-dimethylocta-2,6-diene-1-yl]-5-propylbenzene-1,3-diol, and the anionic cannabinoid molecule is 2-[(2E)-3,7-dimethyl-octa-2,6-diene-1-yl]-3-hydroxy-5-propylphenolate; the cannabinoid molecule is 2-methyl-2-(4-methylpent-3-en-1-yl)-5-hydroxy-7-propyl-2H-1-benzopyran, and the anionic cannabinoid molecule is 2-methyl-2-(4-methylpent-3-en-1-yl)-7-propyl-2H-1-benzopyran-5-oxide; the cannabinoid molecule is 3-propyl-6,6,9-trimethyl-6H-benzo[c]chromen-1-ol, and the anionic cannabinoid molecule is 3-propyl-6,6,9-trimethyl-6H-benzo[c]chromen-1-oxide; the cannabinoid molecule is (6aR,10aR)-3-propyl-6,6-dimethyl-9-(hydroxymethyl)-6a,7,8,10a-tetrahydro-6H-benzo[c]chromen-1-ol, and the anionic cannabinoid molecule is (6aR,10aR)-3-propyl-6,6-dimethyl-9-(hydroxymethyl)-6a,7,8,10a-tetrahydro-6H-benzo[c]chromen-1-oxide; or the cannabinoid molecule is (6aR,10aR)-1-hydroxy-3-(2-methyloct-2-yl)-6,6-dimethyl-6,6a,7,8,10,10a-hexahydro-9H-benzo[c]chromen-9-one, and the anionic cannabinoid molecule is (6aR,10aR)-3-(2-methyloct-2-yl)-6,6-dimethyl-9-oxo-6,6a,7,8,10,10a-hexahydro-9H-benzo[c]chromen-1-oxide.

In some embodiments, alkyl consists of hydrogen, carbon, oxygen, and halogen atoms. In some specific embodiments, alkyl consists of 0 to 9 carbon atoms and 1 to 19 hydrogen atoms. In some very specific embodiments, alkyl is hydro, methyl, ethyl, prop-1-yl, but-1-yl, pent-1-yl, hex-1-yl, hept-1-yl, oct-1-yl, prop-2-yl, but-2-yl, pent-2-yl, hex-2-yl, hept-2-yl, oct-2-yl, 2-methylprop-2-yl, 2-methylbut-2-yl, 2-methylpent-2-yl, 2-methylhex-2-yl, 2-methylhept-2-yl, 2-methyloct-2-yl, 3-methylprop-2-yl, 3-methylbut-2-yl, 3-methylpent-2-yl, 3-methylhex-2-yl, 3-methylhept-2-yl, 3-methyloct-2-yl, or 2-phenyleth-1-yl. In some preferred embodiments, alkyl is prop-1-yl or pent-1-yl.

In some very specific embodiments, the anionic cannabinoid molecule is 2-[(1R,6R)-6-isopropenyl-3-methylcyclohex-2-en-1-yl]-3-hydroxy-5-pentylphenolate; and the cannabinoid molecule is 2-[(1R,6R)-6-isopropenyl-3-methylcyclohex-2-en-1-yl]-5-pentylbenzene-1,3-diol.

VII. Exemplification

The following examples provide a framework to implement certain aspects of the disclosure, and these examples do not limit the disclosure or any claim that matures from this patent document.

Example 1. Preparation of Anionic Cannabinoid Molecules Dissolved in Ethanol 0.5 grams of 2-[(1R,6R)-6-isopropenyl-3-methylcyclohex-2-en-1-yl]-5-pentylbenzene-1,3-diol was dissolved in 3.3 milliliters of 0.5 molar potassium hydroxide in ethanol to produce 2-[(1R,6R)-6-isopropenyl-3-methylcyclohex-2-en-1-yl]-3-hydroxy-5-pentylphenolate. The conversion was confirmed by color because 2-[(1R,6R)-6-isopropenyl-3-methylcyclohex-2-en-1-yl]-5-pentylbenzene-1,3-diol lacks color and 2-[(1R,6R)-6-isopropenyl-3-methylcyclohex-2-en-1-yl]-3-hydroxy-5-pentylphenolate has a deep purple color.

Example 2. Preparation of Sodium and Potassium Salts of Anionic Cannabinoid Molecules The ethanol solution of Example 1 was diluted with 26.7 milliliters of 0.1 molar sodium carbonate in water. A 10 milliliter aliquot was centrifuged to separate the dissolved 2-[(1R,6R)-6-isopropenyl-3-methylcyclohex-2-en-1-yl]-3-hydroxy-5-pentylphenolate from residual 2-[(1R,6R)-6-isopropenyl-3-methylcyclohex-2-en-1-yl]-5-pentylbenzene-1,3-diol, which precipitated. The supernatant was lyophilized to produce salts including a potassium 2-[(1R,6R)-6-isopropenyl-3-methylcyclohex-2-en-1-yl]-3-hydroxy-5-pentylphenolate salt and a sodium 2-[(1R,6R)-6-isopropenyl-3-methylcyclohex-2-en-1-yl]-3-hydroxy-5-pentylphenolate salt.

Example 3. Preparation of Anionic Cannabinoid Molecules Dissolved in Water 1 gram of 2-[(1R,6R)-6-isopropenyl-3-methylcyclohex-2-en-1-yl]-5-pentylbenzene-1,3-diol was dissolved in 6.6 milliliters of 0.5 molar potassium hydroxide in ethanol to produce 2-[(1R,6R)-6-isopropenyl-3-methylcyclohex-2-en-1-yl]-3-hydroxy-5-pentylphenolate. The solution was then diluted with 100 millimolar sodium carbonate in water to a final volume of 50 milliliters. The diluted solution was centrifuged, and five 0.5 milliliter aliquots of the supernatant were each further diluted with 9.5 milliliters of distilled water comprising varying concentrations of sodium bicarbonate ($NaHCO_3$) to determine the approximate $pK_a$ (negative log of the acid dissociation constant) of the 2-[(1R,6R)-6-isopropenyl-3-methylcyclohex-2-en-1-yl]-5-pentylbenzene-1,3-diol. The approximate $pK_a$ was determined by monitoring color as reported in Table 1.

TABLE 1

Samples used to determine the approximate $pK_a$ of 2-[(1R,6R)-6-isopropenyl-3-methylcyclohex-2-en-1-yl]-5-pentylbenzene-1,3-diol

| pH | $NaHCO_3$ concentration in millimolar | color |
|---|---|---|
| 8.0 | 1000 | faint purple |
| 8.3 | 500 | light purple |
| 8.6 | 250 | purple |

TABLE 1-continued

Samples used to determine the approximate pK$_a$ of 2-[(1R,6R)-6-isopropenyl-3-methylcyclohex-2-en-1-yl]-5-pentylbenzene-1,3-diol

| pH | NaHCO$_3$ concentration in millimolar | color |
|---|---|---|
| 8.9 | 125 | purple |
| 9.2 | 62 | purple |

A color change was visually apparent at a pH of 8.0, and a subtle color change was visually apparent at a pH of 8.3. These results suggest that the pK$_a$ of 2-[(1R,6R)-6-isopropenyl-3-methylcyclohex-2-en-1-yl]-5-pentylbenzene-1,3-diol in dilute aqueous solution is between 8.0 and 8.5, which is significantly less than literature values that range from 9.13 to 9.70, and which suggests that 2-[(1R,6R)-6-isopropenyl-3-methylcyclohex-2-en-1-yl]-3-hydroxy-5-pentylphenolate is a viable ingredient for beverages and nutritional supplements.

Example 4. Confirmation of Anionic Cannabinoid Molecule Identity

A composition comprising 2-[(1R,6R)-6-isopropenyl-3-methylcyclohex-2-en-1-yl]-3-hydroxy-5-pentylphenolate dissolved in water was prepared using methods similar to those described in Examples 1 and 3. The 2-[(1R,6R)-6-isopropenyl-3-methylcyclohex-2-en-1-yl]-3-hydroxy-5-pentylphenolate was converted back into 2-[(1R,6R)-6-isopropenyl-3-methylcyclohex-2-en-1-yl]-5-pentylbenzene-1,3-diol using excess glacial acetic acid, and the 2-[(1R,6R)-6-isopropenyl-3-methylcyclohex-2-en-1-yl]-5-pentylbenzene-1,3-diol was extracted from the water using olive oil. The olive oil extract was sent to an independent ISO/JEC 17025 accredited cannabinoid testing laboratory, which confirmed that the only detectable cannabinoid in the sample was 2-[(1R,6R)-6-isopropenyl-3-methylcyclohex-2-en-1-yl]-5-pentylbenzene-1,3-diol.

Example 5. Preparation of Products Containing Anionic Cannabinoid Molecules for Human Consumption Products comprising either 2-[(1R,6R)-6-isopropenyl-3-methylcyclohex-2-en-1-yl]-3-hydroxy-5-pentylphenolate or (6aR,10aR)-3-pentyl-6,6,9-trimethyl-6a,7,8,10a-tetrahydro-6H-benzo[c]chromen-1-oxide dissolved in various polar protic solvents (including ethanol and water) at various concentrations were prepared using methods similar to those described in Examples 1 and 3. The 2-[(1R,6R)-6-isopropenyl-3-methylcyclohex-2-en-1-yl]-3-hydroxy-5-pentylphenolate products generally had a purple color at concentrations ranging from 1 to 500 milligrams per liter, and products containing greater than 500 milligrams per liter were generally opaque. The (6aR,10aR)-3-pentyl-6,6,9-trimethyl-6a,7,8,10a-tetrahydro-6H-benzo[c]chromen-1-oxide products generally had a faint purple color at concentrations ranging from 1 milligram per liter to 1 gram per liter.

Example 6. Human Consumption of Products Containing Anionic Cannabinoid Molecules Products according to Example 5 that were buffered to a pH of 8.5 to 10.5 were considered safe for human consumption. Unbuffered products according to Example 5 were acidified with either lime juice (citric acid) or a carbonated beverage (carbonic acid) immediately prior to consumption to convert the anionic cannabinoid molecules into their conjugate acids, which was confirmed by observation of a color change from purple to either champagne yellow or colorless.

The 2-[(1R,6R)-6-isopropenyl-3-methylcyclohex-2-en-1-yl]-3-hydroxy-5-pentylphenolate products displayed robust favorable pharmacological effects less than 5 minutes after oral consumption at doses as little as 1 milligram. The (6aR,10aR)-3-pentyl-6,6,9-trimethyl-6a,7,8,10a-tetrahydro-6H-benzo[c]chromen-1-oxide displayed nominal psychoactive effects greater than 30 minutes after oral consumption at a dose of 10 milligrams. These results suggest that, in contrast with conventional neutrally-charged cannabinoid molecules, anionic cannabinoid molecules are absorbed by the epithelial lining of the gastrointestinal tract upstream of the stomach, which both allows rapid absorption and bypasses first-pass metabolism because (1) cannabinoids are not known to display robust pharmacological effects within 5 minutes of oral consumption, (2) the neutrally-charged conjugate acid of 2-[(1R,6R)-6-isopropenyl-3-methylcyclohex-2-en-1-yl]-3-hydroxy-5-pentylphenolate is not known to display robust pharmacological effects at all, and (3) the neutrally-charged conjugate acid of (6aR,10aR)-3-pentyl-6,6,9-trimethyl-6a,7,8,10a-tetrahydro-6H-benzo[c]chromen-1-oxide generally displays robust psychoactive effects at an oral dose of 10 milligrams, which is dependent upon the conversion of (6aR,10aR)-3-pentyl-6,6,9-trimethyl-6a,7,8,10a-tetrahydro-6H-benzo[c]chromen-1-ol into oxidation products such as (6aR,10aR)-3-pentyl-6,6-dimethyl-9-(hydroxymethyl)-6a,7,8,10a-tetrahydro-6H-benzo[c]chromen-1-ol during first-pass metabolism.

What is claimed is:

1. A composition, comprising:
    an anionic cannabinoid and a cannabinoid molecule at a molar ratio of 1:10 to 1,000,000:1; and
    one or more of sodium ion ("Na$^+$"), potassium ion ("K$^+$"), calcium ion ("Ca$^{2+}$"), magnesium ion ("Mg$^{2+}$"), chloride ion ("Cl$^-$"), sulfate ("SO$_4^{2-}$"), bicarbonate ("HCO$_3^-$"), and carbonate ("CO$_3^{2-}$");
    wherein:
    the anionic cannabinoid is (6aR,10aR)-3-alkyl-6,6,9-trimethyl-6a,7,8,10a-tetrahydro-6H-benzo[c]chromen-1-oxide;
    the anionic cannabinoid has a conjugate acid;
    the conjugate acid is the cannabinoid molecule; and
    the cannabinoid molecule is (6aR,10aR)-3-alkyl-6,6,9-trimethyl-6a,7,8,10a-tetrahydro-6H-benzo[c]chromen-1-ol.

2. The composition of claim 1, wherein the composition is a liquid, the composition has a pH, and the pH of the composition is 7 to 13.

3. The composition of claim 1, wherein the composition is a liquid, the composition has a pH, and the pH of the composition is 8 to 10.

4. The composition of claim 1, comprising the anionic cannabinoid and the cannabinoid molecule at a molar ratio of 1:10 to 10,000:1.

5. The composition of claim 1, comprising the anionic cannabinoid and the cannabinoid molecule at a molar ratio of 1:1 to 100:1.

6. The composition of claim 1, comprising water.

7. The composition of claim 1, comprising ethanol.

8. The composition of claim 7, comprising ethanol at a concentration by weight of 50 parts per million to 2 percent.

9. The composition of claim 7, comprising ethanol at a concentration by weight of 1 percent to 20 percent.

10. The composition of claim 7, comprising ethanol at a concentration by weight of 10 percent to 95 percent.

11. The composition of claim 1, comprising the anionic cannabinoid at a concentration of 1 milligram per liter to 100 milligrams per liter.

12. The composition of claim 1, comprising the anionic cannabinoid at a concentration of 50 milligrams per liter to 5 grams per liter.

13. The composition of claim 1, comprising the anionic cannabinoid at a concentration of 2 grams per liter to 200 grams per liter.

14. The composition of claim 1, wherein alkyl is selected from hydro, methyl, ethyl, prop-1-yl, but-1-yl, pent-1-yl, hex-1-yl, hept-1-yl, oct-1-yl, prop-2-yl, but-2-yl, pent-2-yl, hex-2-yl, hept-2-yl, oct-2-yl, 2-methylprop-2-yl, 2-methylbut-2-yl, 2-methylpent-2-yl, 2-methylhex-2-yl, 2-methylhept-2-yl, 2-methyloct-2-yl, 3-methylprop-2-yl, 3-methylbut-2-yl, 3-methylpent-2-yl, 3-methylhex-2-yl, 3-methylhept-2-yl, 3-methyloct-2-yl, and 2-phenyleth-1-yl.

15. The composition of claim 1, wherein alkyl is pent-1-yl.

16. A composition, comprising an anionic cannabinoid and a cannabinoid molecule at a molar ratio of 1:10 to 10,000:1, wherein:

the anionic cannabinoid is (6aR,10aR)-3-alkyl-6,6,9-trimethyl-6a,7,8,10a-tetrahydro-6H-benzo[c]chromen-1-oxide;

the anionic cannabinoid has a conjugate acid;

the conjugate acid is the cannabinoid molecule;

the cannabinoid molecule is (6aR,10aR)-3-alkyl-6,6,9-trimethyl-6a,7,8,10a-tetrahydro-6H-benzo[c]chromen-1-ol;

the composition comprises a solid phase;

the solid phase comprises a salt; and the salt comprises the anionic cannabinoid.

17. The composition of claim 16, wherein the salt comprises a cation selected from sodium ion ($Na^+$), potassium ion ($K^+$), calcium ion ($Ca^{2+}$), and magnesium ion ($Mg^{2+}$).

18. The composition of claim 16, wherein alkyl is selected from hydro, methyl, ethyl, prop-1-yl, but-1-yl, pent-1-yl, hex-1-yl, hept-1-yl, oct-1-yl, prop-2-yl, but-2-yl, pent-2-yl, hex-2-yl, hept-2-yl, oct-2-yl, 2-methylprop-2-yl, 2-methylbut-2-yl, 2-methylpent-2-yl, 2-methylhex-2-yl, 2-methylhept-2-yl, 2-methyloct-2-yl, 3-methylprop-2-yl, 3-methylbut-2-yl, 3-methylpent-2-yl, 3-methylhex-2-yl, 3-methylhept-2-yl, 3-methyloct-2-yl, and 2-phenyleth-1-yl.

19. The composition of claim 16, wherein alkyl is pent-1-yl.

* * * * *